(12) United States Patent
Patera et al.

(10) Patent No.: US 11,383,990 B2
(45) Date of Patent: *Jul. 12, 2022

(54) CUSTOMIZABLE MULTI-STAGE WATER TREATMENT SYSTEM

(71) Applicant: Whirlpool Corporation, Benton Harbor, MI (US)

(72) Inventors: Ginger Elayne Patera, St. Joseph, MI (US); Steven John Kuehl, Stevensville, MI (US); Mark M. Senninger, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 4 days.

This patent is subject to a terminal disclaimer.

(21) Appl. No.: 16/987,035

(22) Filed: Aug. 6, 2020

(65) Prior Publication Data

US 2020/0377377 A1 Dec. 3, 2020

Related U.S. Application Data

(60) Continuation of application No. 16/184,717, filed on Nov. 8, 2018, now Pat. No. 10,759,675, which is a
(Continued)

(51) Int. Cl.
*B01D 24/00* (2006.01)
*B01D 27/14* (2006.01)
(Continued)

(52) U.S. Cl.
CPC ............ *C02F 1/003* (2013.01); *B01D 24/007* (2013.01); *B01D 27/14* (2013.01); *B01D 29/56* (2013.01);
(Continued)

(58) Field of Classification Search
CPC .... C02F 1/003; C02F 5/10; C02F 1/28; C02F 1/42; C02F 5/14; C02F 5/105;
(Continued)

(56) References Cited

U.S. PATENT DOCUMENTS 630,870 A 8/1899 Driesbach
773,946 A 11/1904 Langill
(Continued)

FOREIGN PATENT DOCUMENTS

CA 2524132 A1 4/2006
CN 201906509 U 7/2011
(Continued)

OTHER PUBLICATIONS

European Patent Office, "Extended European Search Report," issued in connection with EP Application No. 13191965.6, dated Jan. 7, 2014, 6 pages.
(Continued)

*Primary Examiner* — Joseph W Drodge
(74) *Attorney, Agent, or Firm* — Nyemaster Goode, P.C.

(57) ABSTRACT

A customizable multi-stage fluid treatment assembly typically includes a connector, a plurality of cartridges, and a cap. The plurality of cartridges have a treatment medium spaced within an interior volume of the individual cartridges, between the ends thereof. The ends of the plurality of cartridges are configured to receive a fluid, bring the fluid into operative contact with the treatment medium, and dispense the fluid from the opposing end of the cartridge. The connector is coupled with one end of the plurality of cartridges and has an inlet and an outlet for receiving and dispensing the fluid to and from an appliance. The cap is coupled with the other end of the plurality of cartridges, enclosing the fluid treatment assembly, which is configured to be received in a cavity of an appliance. The cartridges of
(Continued)

the plurality of cartridges may be individually replaced with cartridges to meet customized needs.

18 Claims, 14 Drawing Sheets

Related U.S. Application Data continuation of application No. 15/144,501, filed on May 2, 2016, now Pat. No. 10,155,669, which is a division of application No. 13/674,276, filed on Nov. 12, 2012, now Pat. No. 9,327,216.

(51) Int. Cl.
| | |
|---|---|
| *B01D 29/56* | (2006.01) |
| *B01D 63/00* | (2006.01) |
| *B01D 35/30* | (2006.01) |
| *C02F 1/00* | (2006.01) |
| *C02F 1/28* | (2006.01) |
| *C02F 1/42* | (2006.01) |
| *C02F 5/10* | (2006.01) |
| *C02F 5/14* | (2006.01) |
| *C02F 1/68* | (2006.01) |
| *C02F 103/02* | (2006.01) |

(52) U.S. Cl.
CPC ............... *B01D 63/00* (2013.01); *C02F 1/28* (2013.01); *C02F 1/42* (2013.01); *C02F 5/10* (2013.01); *C02F 5/105* (2013.01); *C02F 5/14* (2013.01); *B01D 35/30* (2013.01); *C02F 1/688* (2013.01); *C02F 2103/026* (2013.01); *C02F 2201/003* (2013.01); *C02F 2201/004* (2013.01); *C02F 2201/006* (2013.01); *C02F 2307/06* (2013.01); *C02F 2307/12* (2013.01)

(58) Field of Classification Search
CPC .. C02F 2307/12; C02F 1/688; C02F 2307/06; C02F 2201/004; C02F 2201/003; C02F 2103/026; C02F 2201/006; C02F 1/00; C02F 2307/10; C02F 5/08; C02F 9/00; C02F 2209/40; C02F 2301/026; C02F 2301/08; B01D 29/56; B01D 27/14; B01D 63/00; B01D 24/007; B01D 35/30; B01D 24/00; B01D 24/10; B01D 27/08; B01D 27/146; B01D 29/0052; B01D 35/301; B01D 35/306; B01D 37/00; B01D 37/02; B01D 37/025; B01D 61/022; B01D 61/142; B01D 2201/30; B01D 2201/302; B01D 2201/305; B01D 2201/306; B01D 2201/31; B01D 2201/40; B01D 2201/4015; B01D 2201/4023; B01D 2201/4046; B01D 2201/4053; B01D 2201/4061; B01D 2201/52; B01D 2201/56; B01D 2201/29; B01D 2201/301; E05B 63/00; E05B 63/0004; E05B 63/14; E05B 63/143
USPC ......... 210/91, 232, 435, 440, 443, 445, 450, 210/455, 483; 55/490, 492, 495, 501, 55/502; 70/1, 57, 63, 262
See application file for complete search history.

(56) References Cited

U.S. PATENT DOCUMENTS

| | | |
|---|---|---|
| 1,259,498 A | 3/1918 | Elmore |
| 3,237,770 A | 3/1966 | Humbert, Jr. |
| 3,561,602 A | 2/1971 | Molitor |
| 3,714,292 A | 1/1973 | Baum et al. |
| 3,891,555 A | 6/1975 | Bennett et al. |
| 4,207,944 A | 6/1980 | Holtz et al. |
| 4,757,921 A | 7/1988 | Snowball |
| 4,792,059 A | 12/1988 | Kerner et al. |
| 4,808,303 A | 2/1989 | Edwards et al. |
| 4,828,698 A | 5/1989 | Jewell et al. |
| 4,832,836 A | 5/1989 | Selsdon |
| 4,909,937 A | 3/1990 | Hoffmann et al. |
| 5,160,038 A | 11/1992 | Harada et al. |
| 5,273,649 A | 12/1993 | Magnusson et al. |
| 5,292,158 A | 3/1994 | Kurosaki |
| 5,328,605 A | 7/1994 | Lin |
| 5,586,439 A | 12/1996 | Schlosser et al. |
| 5,635,063 A | 6/1997 | Rajan et al. |
| 5,715,699 A | 2/1998 | Coates et al. |
| 5,766,463 A | 6/1998 | Janik et al. |
| 5,826,854 A | 10/1998 | Janvrin et al. |
| 5,996,810 A | 12/1999 | Bounnakhom et al. |
| 6,080,313 A | 6/2000 | Kelada |
| 6,099,735 A | 8/2000 | Kelada |
| 6,101,835 A | 8/2000 | Butsch et al. |
| 6,328,167 B1 | 12/2001 | Seshimoto et al. |
| 6,458,260 B2 | 10/2002 | Nemelka |
| 6,572,769 B2 | 6/2003 | Rajan et al. |
| 6,675,593 B1 | 1/2004 | Suydam et al. |
| 6,800,200 B2 | 10/2004 | Bassett et al. |
| 6,852,289 B2 | 2/2005 | Gordon et al. |
| 7,000,894 B2 | 2/2006 | Olson et al. |
| 7,043,150 B2 | 5/2006 | Krause et al. |
| 7,047,754 B2 | 5/2006 | An et al. |
| 7,081,201 B2 | 7/2006 | Bassett et al. |
| 7,125,434 B2 | 10/2006 | Yavorsky et al. |
| 7,130,533 B2 | 10/2006 | Kim et al. |
| 7,137,272 B2 | 11/2006 | Park et al. |
| 7,138,052 B2 | 11/2006 | Reid |
| 7,163,625 B1 | 1/2007 | Williamson et al. |
| 7,186,337 B2 | 3/2007 | Reid |
| 7,207,189 B2 | 4/2007 | An et al. |
| 7,252,757 B2 | 8/2007 | Warren et al. |
| 7,276,161 B2 | 10/2007 | Rajan et al. |
| 7,413,663 B2 | 8/2008 | Rajan et al. |
| 7,476,314 B2 | 1/2009 | Reid |
| 7,610,849 B2 | 11/2009 | Bigge et al. |
| 7,610,932 B2 | 11/2009 | Olson et al. |
| 7,611,173 B2 | 11/2009 | Helton et al. |
| 7,614,508 B2 | 11/2009 | Mitchell et al. |
| 7,640,766 B2 | 1/2010 | Shelton |
| 7,748,570 B2 | 7/2010 | Bordino |
| 7,814,769 B2 | 10/2010 | Kim et al. |
| 7,823,407 B2 | 11/2010 | Lim et al. |
| 7,985,343 B2 | 7/2011 | Haldopoulos et al. |
| 7,985,346 B2 | 7/2011 | Poon et al. |
| 8,001,801 B2 | 8/2011 | Coleman |
| 8,137,551 B1 | 3/2012 | Huda et al. |
| 8,940,164 B2 | 1/2015 | Ferreira et al. |
| 9,314,716 B2 | 4/2016 | Patera et al. |
| 9,320,993 B2 | 4/2016 | Patera et al. |
| 9,327,216 B2 | 5/2016 | Patera et al. |
| 9,366,474 B2 | 6/2016 | Guess et al. |
| 9,539,526 B2 | 1/2017 | Bradford et al. |
| 10,022,658 B2 | 7/2018 | Kruckenberg et al. |
| 10,155,669 B2 * | 12/2018 | Patera .................. C02F 1/42 |
| 10,759,675 B2 * | 9/2020 | Patera .................. C02F 5/10 |
| 2001/0040120 A1 * | 11/2001 | Jousset .................. B01D 29/15 |
| | | 210/450 |
| 2002/0110482 A1 | 8/2002 | Lawton |
| 2002/0166805 A1 | 11/2002 | Minns et al. |
| 2003/0019819 A1 | 1/2003 | Fritze |
| 2003/0034285 A1 | 2/2003 | Hembree |
| 2003/0217958 A1 | 11/2003 | Reid |
| 2004/0129617 A1 | 7/2004 | Tanner et al. |
| 2004/0129627 A1 | 7/2004 | McGibbon |
| 2004/0211717 A1 | 10/2004 | Mitchell et al. |
| 2005/0023209 A1 * | 2/2005 | Clausen ............... B01D 36/001 |
| | | 210/450 |
| 2005/0089458 A1 | 4/2005 | Oke |
| 2005/0098492 A1 | 5/2005 | Harrison |
| 2006/0049086 A1 | 3/2006 | Axelrod |

(56) References Cited

U.S. PATENT DOCUMENTS

| | | |
|---|---|---|
| 2006/0049096 A1 | 3/2006 | Bassett et al. |
| 2006/0124532 A1 | 6/2006 | Magnusson et al. |
| 2006/0144066 A1 | 7/2006 | Lee et al. |
| 2006/0254971 A1 | 11/2006 | Tubby et al. |
| 2007/0075025 A1 | 4/2007 | Patel et al. |
| 2007/0084772 A1 | 4/2007 | Holler |
| 2007/0102332 A1 | 5/2007 | Bommi et al. |
| 2007/0199876 A1 | 8/2007 | Tubby et al. |
| 2007/0241045 A1 | 10/2007 | Kott et al. |
| 2007/0251261 A1 | 11/2007 | Son et al. |
| 2007/0272620 A1 | 11/2007 | Chaney |
| 2008/0035552 A1 | 2/2008 | Lee |
| 2008/0047889 A1 | 2/2008 | Huda |
| 2009/0008318 A1 | 1/2009 | Anes et al. |
| 2009/0045106 A1 | 2/2009 | Kuennen et al. |
| 2009/0077992 A1 | 3/2009 | Anderson et al. |
| 2009/0173675 A1 | 7/2009 | Scholz et al. |
| 2009/0215412 A1 | 8/2009 | Liu et al. |
| 2009/0217694 A1 | 9/2009 | Kim et al. |
| 2009/0236271 A1* | 9/2009 | Eserkaln .............. C02F 9/005 210/137 |
| 2009/0236276 A1* | 9/2009 | Kurth .................. C02F 9/005 210/232 |
| 2009/0249821 A1 | 10/2009 | Zentner et al. |
| 2009/0283467 A1 | 11/2009 | Wallerstorfer et al. |
| 2009/0293735 A1 | 12/2009 | Van Dillen et al. |
| 2009/0314703 A1 | 12/2009 | Beach et al. |
| 2010/0006508 A1 | 1/2010 | Mitchell et al. |
| 2010/0018238 A1 | 1/2010 | Gerner et al. |
| 2010/0059455 A1 | 3/2010 | Hsueh et al. |
| 2010/0175415 A1 | 7/2010 | Kim |
| 2010/0219131 A1 | 9/2010 | Levy |
| 2010/0221394 A1 | 9/2010 | Gaulard et al. |
| 2010/0243581 A1 | 9/2010 | Williams et al. |
| 2011/0006009 A1 | 1/2011 | Hamlin et al. |
| 2011/0068053 A1 | 3/2011 | Kim et al. |
| 2011/0174705 A1 | 7/2011 | Branscomb |
| 2011/0185762 A1 | 8/2011 | Kruckenberg et al. |
| 2011/0198301 A1 | 8/2011 | Haldopoulos et al. |
| 2011/0278242 A1 | 11/2011 | Levy |
| 2011/0278243 A1 | 11/2011 | Levy |
| 2012/0067803 A1 | 3/2012 | Ferreira et al. |
| 2012/0144854 A1 | 6/2012 | Huda et al. |
| 2012/0263801 A1 | 10/2012 | Code et al. |
| 2014/0110331 A1 | 4/2014 | Baird |
| 2014/0374339 A1* | 12/2014 | Williams ............... C02F 1/002 210/493.1 |
| 2022/0040606 A1* | 2/2022 | Kruckenberg ......... B01D 35/30 |
| 2022/0040607 A1* | 2/2022 | Kruckenberg ....... B01D 35/306 |
| 2022/0040608 A1* | 2/2022 | Kruckenberg ......... B01D 35/30 |
| 2022/0040609 A1* | 2/2022 | Kruckenberg ....... B01D 35/306 |

FOREIGN PATENT DOCUMENTS

| | | |
|---|---|---|
| DE | 3700372 C1 | 11/1987 |
| DE | 202008007246 U1 | 10/2008 |
| JP | 63175685 A | 7/1988 |
| JP | 4227009 B2 | 7/2005 |
| WO | 2002036248 A1 | 5/2002 |
| WO | 2008062948 A1 | 5/2008 |
| WO | 2009127025 A2 | 10/2009 |

OTHER PUBLICATIONS

European Patent Office, "Extended European Search Report," issued in connection with EP Application No. 13191729.6, dated Feb. 13, 2014, 6 pages.

European Patent Office, "Extended European Search Report," issued in connection with EP Application No. 13192204.9, dated Feb. 13, 2014, 6 pages.

European Patent Office, "Extended European Search Report," issued in connection with EP Application No. 13191798.1, dated Feb. 13, 2014, 7 pages.

* cited by examiner

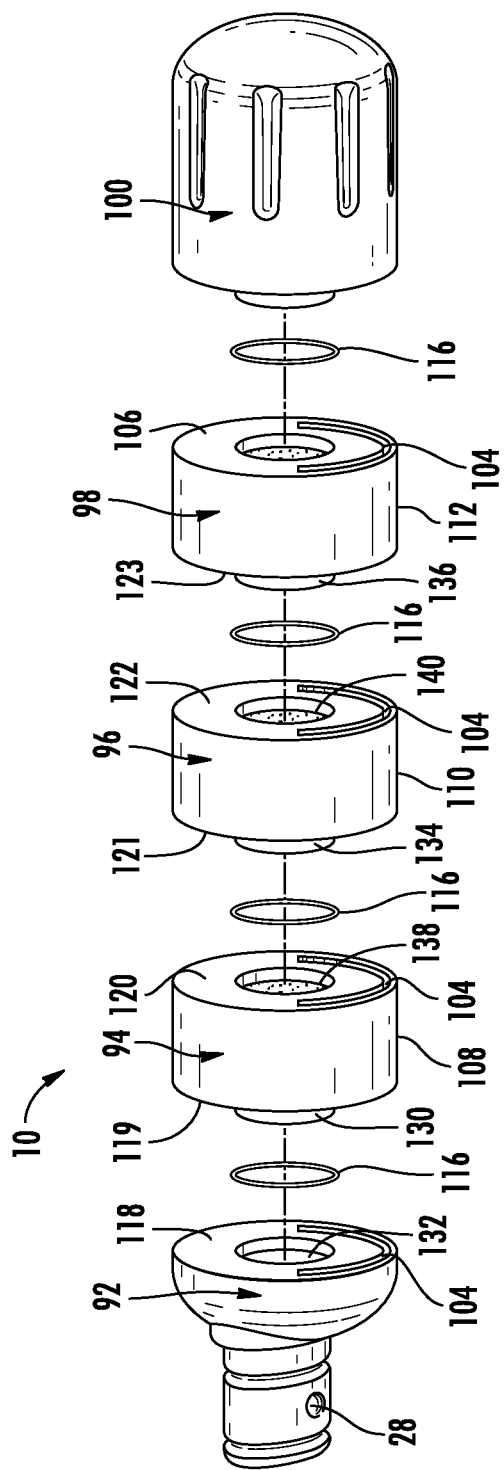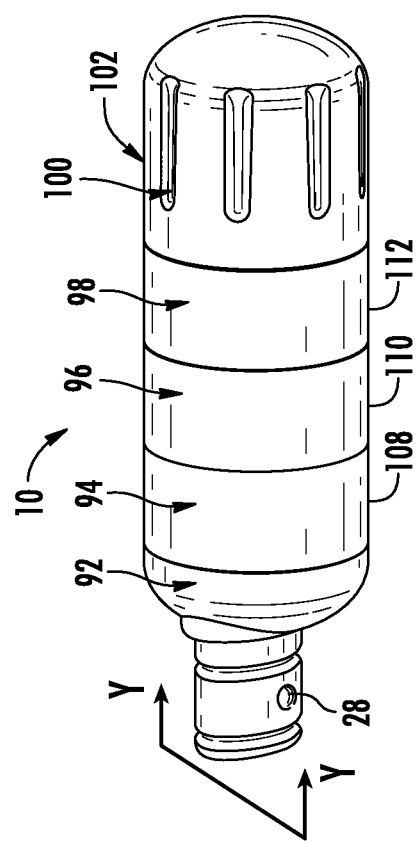

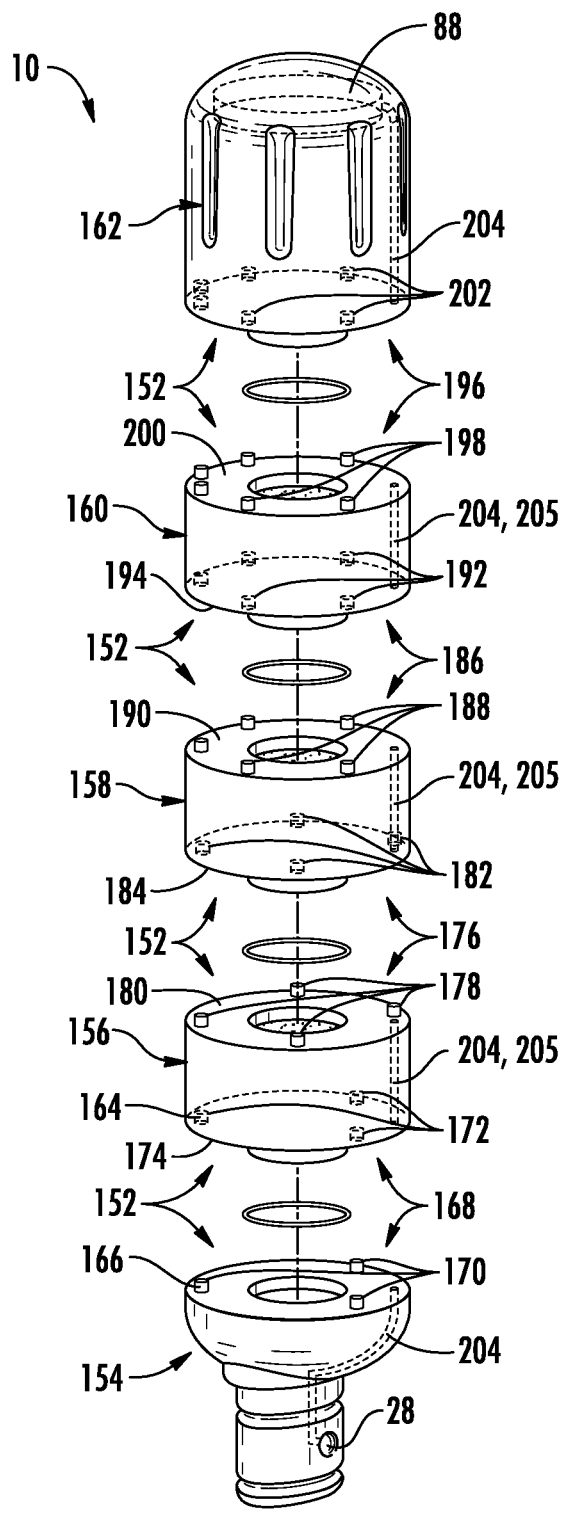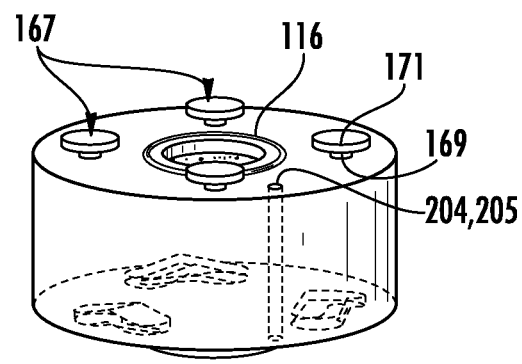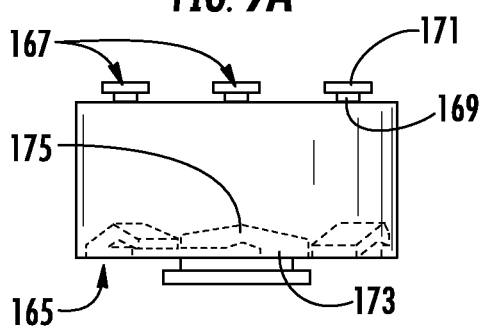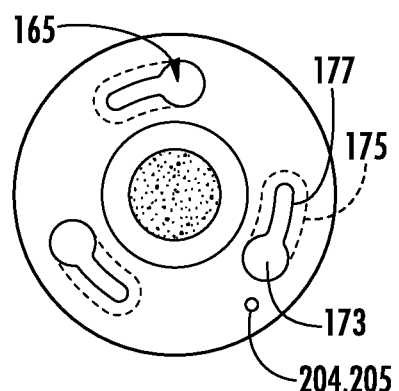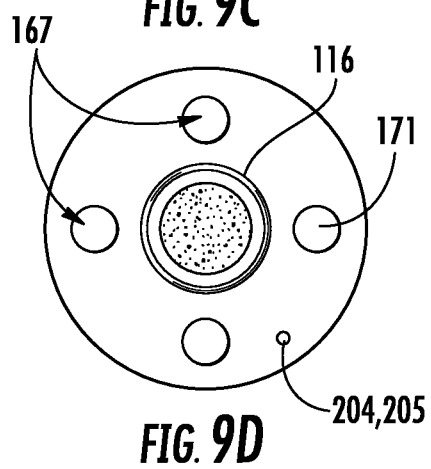
FIG. 9
FIG. 9A
FIG. 9B
FIG. 9C
FIG. 9D

CUSTOMIZABLE MULTI-STAGE WATER TREATMENT SYSTEM

CROSS REFERENCE TO RELATED APPLICATIONS

This application is a continuation of U.S. patent application Ser. No. 16/184,717, entitled CUSTOMIZABLE MULTI-STAGE WATER TREATMENT SYSTEM, filed on Nov. 8, 2018. U.S. patent application Ser. No. 16/184,717 is a continuation of U.S. patent application Ser. No. 15/144,501, entitled CUSTOMIZABLE MULTI-STAGE WATER TREATMENT SYSTEM, filed on May 2, 2014, now U.S. Pat. No. 10,155,669, the disclosures of which are hereby incorporated by reference in their entirety. U.S. patent application Ser. No. 15/144,501 is a division of U.S. patent application Ser. No. 13/674,276, now U.S. Pat. No. 9,327,216, entitled CUSTOMIZABLE MULTI-STAGE WATER TREATMENT SYSTEM, filed on Nov. 12, 2012, the disclosure of which is hereby incorporated by reference in its entirety. U.S. Pat. No. 9,327,216 is related to U.S. patent application Ser. No. 13/674,300, now U.S. Pat. No. 9,314,716, entitled CUSTOMIZABLE MULTI-STAGE WATER TREATMENT ASSEMBLY; Ser. No. 13/674,313, now U.S. Pat. No. 9,320,993, entitled FILTER HOUSING FOR SMALL MEDIA; Ser. No. 13/674,289, entitled MULTI-STAGE FLUID FILTER ASSEMBLY WITH FILTRATION MEMBRANE; and Ser. No. 13/674,266, now U.S. Pat. No. 9,889,478, entitled CONSUMABLE DESCALING CARTRIDGES FOR A REFRIGERATOR APPLIANCE. The disclosures of each of the above documents are hereby incorporated by reference in their entirety.

FIELD OF THE INVENTION

The present invention generally relates to water treatment assemblies for appliances typically domestic refrigerators, refrigerators and freezers, freezers, or ice making devices, and more specifically relates to a customizable water treatment assembly adapted to engage to an interior cavity of an appliance.

BACKGROUND OF THE INVENTION

Water filters are commonly used in appliances and applied to other household water sources. Generally these applications of water filters require the filter to be substantially compact in size and free of internal moving parts. Further, these filters are relied upon to filter impurities from water sources, such as well water and municipal water, for human consumption among other things. The commonly used water filters for appliances typically have fixed filtering capabilities and are wholly disposable upon expiration of useful life.

SUMMARY OF THE INVENTION

According to one aspect of the present invention, a customizable multi-stage water treatment system includes a base cartridge, a first variable cartridge, a second variable cartridge, a connector, and a keyed mating arrangement. The base cartridge has a first end, a second end, and a sidewall extending between the first and second ends and surrounding a base interior volume. A base treatment medium is spaced within the base interior volume. The first variable cartridge is configured to be removably engaged by hand, typically without the use of tools with the base cartridge, such that the first variable cartridge has a first coupler end engaged with the second end of the base cartridge. The first variable cartridge also has a first receiver end and a first wall extending between the first coupler and first receiver ends and surrounding a first interior volume. A first treatment medium is spaced within the first interior volume. The second variable cartridge is configured to be removably engaged by hand, typically without the use of tools, with the first variable cartridge, such that the second variable cartridge has a second coupler end engaged with the first receiver end of the first variable cartridge. The second variable cartridge also has a second receiver end and a second wall extending between the second coupler and the second receiver ends and surrounding a second interior volume. A second treatment medium is spaced within the second interior volume. The connector is coupled with the first end of the base cartridge and has an inlet for receiving an intake water from a water source and an outlet for dispensing a treated water to a user. The connector is devoid of treatment medium. The base, first variable, and second variable cartridges together are configured to receive the intake water, to bring the intake water into operative contact with the base, first, and second treatment mediums to change the intake water to the treated water. The keyed mating arrangement is disposed on the connector, the base cartridge, first variable cartridge, and second variable cartridge accordingly, the keyed mating arrangement is configured to prohibit the base cartridge from matingly engaging in a fluid tight manner with the second variable cartridge and to prohibit the connector from matingly engaging in a fluid tight manner with the first and second variable cartridges.

According to another aspect of the present invention, a water treatment cartridge for a customizable multi-stage water treatment system for an appliance includes a first end, a second end, and a sidewall extending between the first and second ends enclosing an interior volume. A treatment medium is spaced within the interior volume, such that the first end is configured to receive a water flow from the appliance, bring the water flow into operative contact with the treatment medium, and dispense the water flow from the second end, in such a manner that the fluid travels through the water treatment cartridge. A channel is formed within the sidewall between the first end and the second end. The channel is configured to transport the water flow from the second end to the first end. Further, a first locking configuration is disposed on the first end and a second locking configuration disposed on the second end, such that the first end is configured to directly engage a corresponding first locking configuration and the second end is configured to directly engage a corresponding second locking configuration. The first and second locking configurations arrange the cartridge at a specific stage of the water treatment system.

According to yet another aspect of the present invention, a method of treating a fluid using a customizable multi-stage fluid treatment apparatus for an appliance includes several steps. A step includes exposing a receiving cavity on a filter head assembly of the appliance is exposed to allow for removal or insertion of a fluid treatment apparatus. Next, a base cartridge of a fluid treatment apparatus is grasped having a first end, a second end, and a sidewall extending between the first and second ends enclosing an interior volume, wherein a base treatment medium is spaced within the interior volume, and wherein the first and second ends are configured to receive a fluid, bring the fluid into operative contact with the base treatment medium, and dispense the fluid, such that the fluid travels through the base cartridge. Next, a first coupler end of a first variable cartridge of a fluid treatment apparatus is removably and sealably engaged by hand, typically without the use of tools with the second end of the base cartridge, wherein the first variable cartridge includes a first receiver end and a first wall extending between the first coupler end and the first receiver end enclosing a first inside volume, and wherein a first treatment medium is spaced within the first inside volume, and wherein the first coupler end and the first receiver ends are configured to receive the fluid, bring the fluid into operative contact with the first treatment medium, and dispense the fluid, such that the fluid travels through the first variable cartridge. Next, a connector of a fluid treatment apparatus is removably and sealably engaged by hand with the first end of the base cartridge, wherein the connector has an inlet and an outlet for receiving and dispensing the fluid to and from the appliance and configured to receive and dispense the fluid to and from the base cartridge, and wherein a keyed mating arrangement is disposed between the connector and the base cartridge and between the base cartridge and the first variable cartridge, such that the keyed mating arrangement prevents the connector from directly sealably engaging the first variable cartridge. Next, the fluid treatment apparatus is inserted in the receiving cavity of the filter head assembly and is aligned in a connecting position with the filter head assembly. Next, the first variable cartridge is rotated to manipulate and align the connector of the fluid treatment apparatus, thereby engaging the inlet of the connector with a water supply port of the filter head assembly and the outlet of the connector with a water delivery port of the filter head assembly. Next, a by-pass valve in the filter head assembly is opened by rotating the first variable cartridge of the fluid treatment apparatus, thereby supplying a water flow from the appliance through the inlet, through the fluid treatment apparatus, wherein the water flow is treated and thereafter dispensed through the outlet back into the appliance.

These and other features, advantages, and objects of the present invention will be further understood and appreciated by those skilled in the art by reference to the following specification, claims, and appended drawings.

BRIEF DESCRIPTION OF THE DRAWINGS

FIG. 7 is an exploded top perspective view of an additional embodiment of a customizable multi-stage fluid treatment assembly;

FIG. 8 is a top perspective view of an assembled customizable multi-stage fluid treatment assembly of the embodiment of FIG. 7;

FIG. 9 is an exploded top perspective view of an additional embodiment of a customizable multi-stage fluid treatment assembly showing a keyed mating arrangement;

FIG. 9A is a top perspective view of a cartridge of the fluid treatment assembly having an additional embodiment of the keyed mating arrangement;

FIG. 9B is a side elevational view of a cartridge of the fluid treatment assembly having an additional embodiment of the keyed mating arrangement;

FIG. 9C is a bottom plan view of a cartridge of the fluid treatment assembly having an additional embodiment of the keyed mating arrangement;

FIG. 9D is a top plan view of a cartridge of the fluid treatment assembly having an additional embodiment of the keyed mating arrangement;

DETAILED DESCRIPTION

Figure 1:
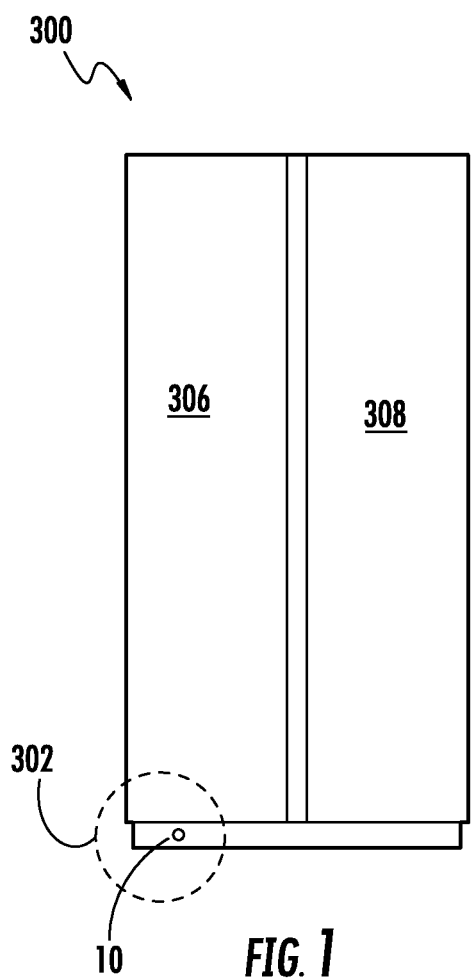
FIG. 1 is a front elevational view of a refrigerator and freezer appliance that indicates a general location where a customizable multi-stage fluid treatment assembly may be operably connected to the appliance.

For purposes of description herein, the terms "upper," "lower," "right," "left," "rear," "front," "vertical," "horizontal," and derivates thereof shall relate to the customizable multi-stage fluid treatment assembly as oriented in FIG. 1. However, it is to be understood that the customizable multi-stage fluid treatment assembly may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As generally illustrated in FIGS. 1-10B, the reference numeral 10 generally designates one embodiment of a customizable multi-stage fluid treatment assembly or water treatment assembly. The customizable multi-stage fluid treatment assembly 10 typically includes a connector 12, a base cartridge 14, a first variable cartridge 16, and a cap 18. The base cartridge 14 has a base treatment medium 20 spaced within an interior volume 22 of the base cartridge 14, between a first end 24 and a second end 26 of the base cartridge 14, such that the first and second ends 24, 26 of the base cartridge are configured to receive a fluid, bring the fluid into operative contact with the base treatment medium 20, and dispense the fluid from the opposing end of the base cartridge 14. The connector 12 is coupled with the first end 24 of the base cartridge 14 and has an inlet 28 and an outlet 30 for receiving and dispensing the fluid to and from an appliance. The connector 12 is typically devoid of any treatment medium. The first variable cartridge 16 has a first coupler end 32 that is configured to be removably engaged and disengaged by hand with the second end 26 of the base cartridge without the use of tools. The first variable cartridge 16 also has a first filter medium 34 spaced within a first inside volume 36 between the first coupler end 32 and a first receiver end 38, such that the first coupler and the receiver ends 32, 38 of the first variable cartridge 16 are configured to receive the fluid, bring the fluid into operative contact with the first filter medium 34, and dispense the fluid from the first variable cartridge 16. The cap 18 is coupled with the first receiver end 38 of the first variable cartridge 16, enclosing the fluid treatment assembly 10.

Figure 2:
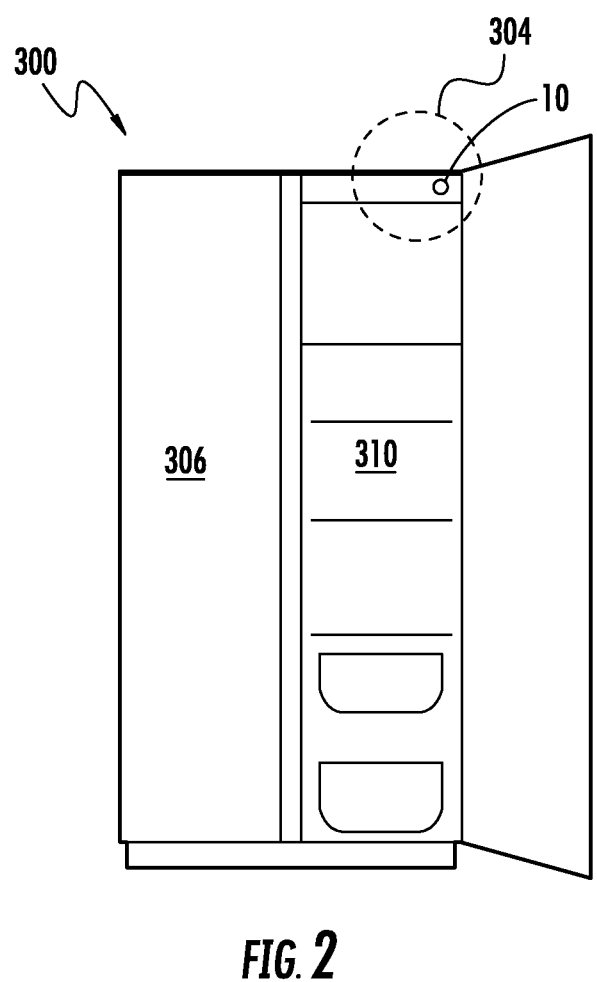
FIG. 2 is front elevational view of a refrigerator and freezer appliance having a refrigerator door open and a general location where a customizable multi-stage fluid treatment assembly may be operably connected to the appliance.
Figure 3:
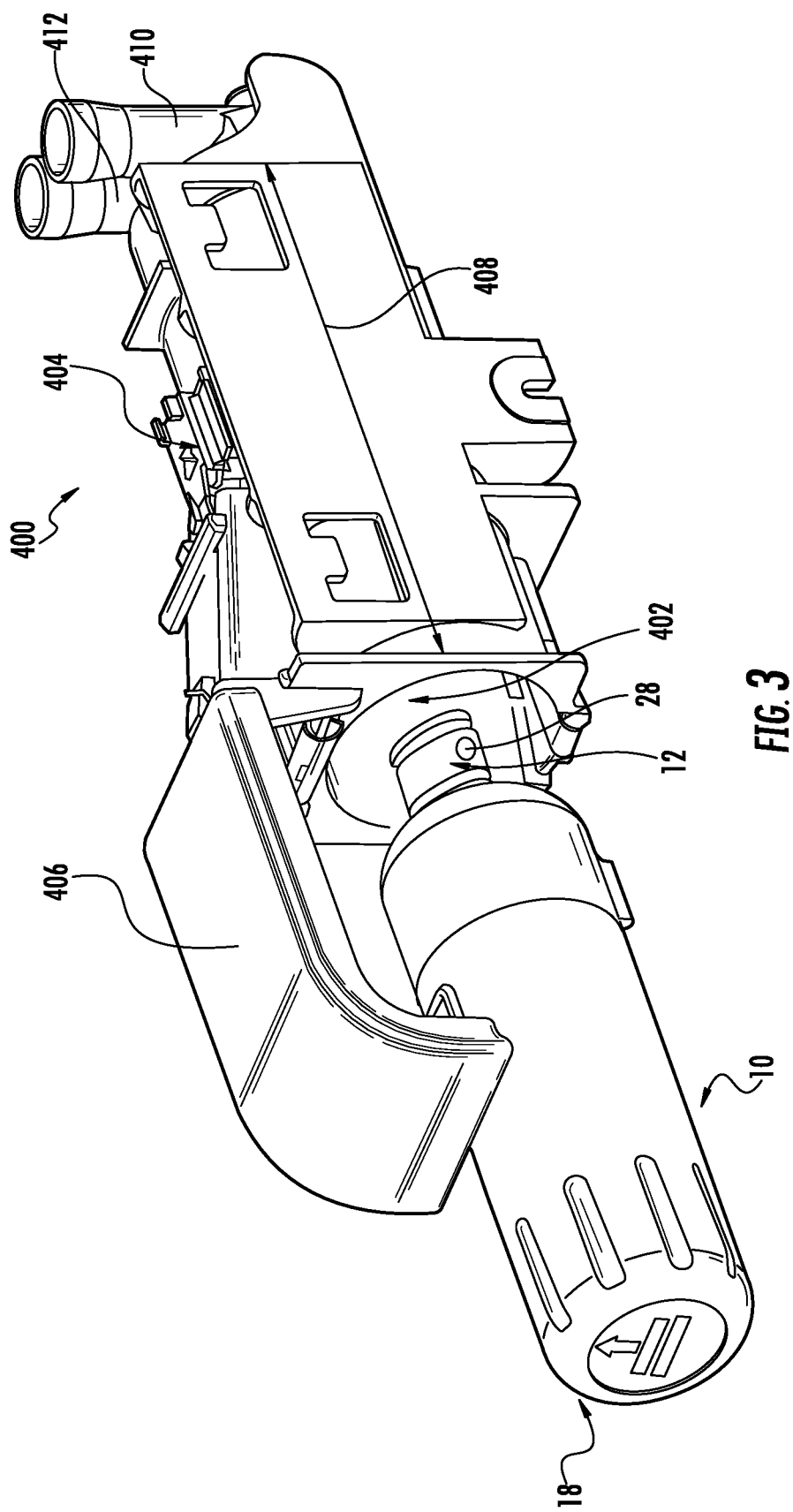
FIG. 3 is a top perspective view of a filter head assembly of an appliance and a customizable multi-stage fluid treatment assembly.

As shown in FIGS. 1-3, the fluid treatment assembly 10 is generally installed by hand and without the use of tools and is configured to be removably engaged and disengaged with a domestic refrigerator appliance 300. Filter assemblies of the present invention may also be used in other applications, including other appliances that store, use, or dispense ice, water, or other liquid to be filtered and/or treated. The fluid treatment assembly 10 is generally configured to engage the appliance 300, typically via a filter head assembly 400 (FIG. 3) in either the lower grille portion 302 (FIG. 1) or the upper panel portion 304 (FIG. 2) of a domestic refrigerator. Generally, the fluid treatment assembly is pushed into a receiving cavity 402 of the filter head assembly 400 and typically twisted about its central longitudinal axis by hand into engagement and out of engagement with the appliance 300. It is conceivable, however, that other linear forces, torque forces, and combinations thereof may be used to engage and disengage the fluid treatment assembly 10 with an appliance without the use of tools. In the illustrated embodiments, a side-by-side domestic refrigerator is shown having a freezer section 306 on the left side and a refrigerator section (fresh food compartment) 308 on the right side.

The interior portion 310 of the refrigerator section typically has an upper panel portion 304 extending across the top portion of the section. Generally, a fluid treatment assembly 10 that is located on the interior portion 310 of the appliance 300 is located in the refrigerator section 308 to avoid freezing temperatures. In particular, the upper panel portion 304 in a refrigerator section 308 provides a suitable location for the fluid treatment assembly 10, as this location is also frequently occupied by temperature controls or other user interfaces or displays. A drop down, push button activated access door in the ceiling of the appliance may also be opened and the fluid treatment assembly 10 inserted and engaged to the appliance through this access door.

The lower grille portion 302 of the domestic refrigerator appliance 300 is also a suitable location for the fluid treatment assembly 10, as such a location typically provides close proximity to a water source connection leading to the appliance, has an above-freezing temperature, and is near other electrical components and devices, such as the compressor. Additionally, other suitable locations that allow water egress and ingress are conceivable on domestic refrigerators, refrigerators and freezers, freezers, ice makers, humidifiers, dishwashers, laundry machines, and other appliances.

As shown in FIG. 3, the filter head assembly 400 may include a receptor 404 for mechanically retaining and supporting the fluid treatment assembly 10 in addition to optionally allowing the appliance 300 to detect the presence of the fluid treatment assembly 10, to allow the appliance 300 to make a connection with the fluid treatment assembly 10, and to allow the appliance 300 to detect the capacity, type, status, and quality of the fluid treatment assembly 10. The filter head assembly 400 includes the receiving cavity 402 that may be accessed by a user by opening an access door 406 hingedly coupled with the filter head assembly 400. It is also contemplated that a threaded access cap or other closure may be used to conceal the cavity. The cavity has a depth 408 configured to received the fluid treatment assembly 10.

Figure 4:
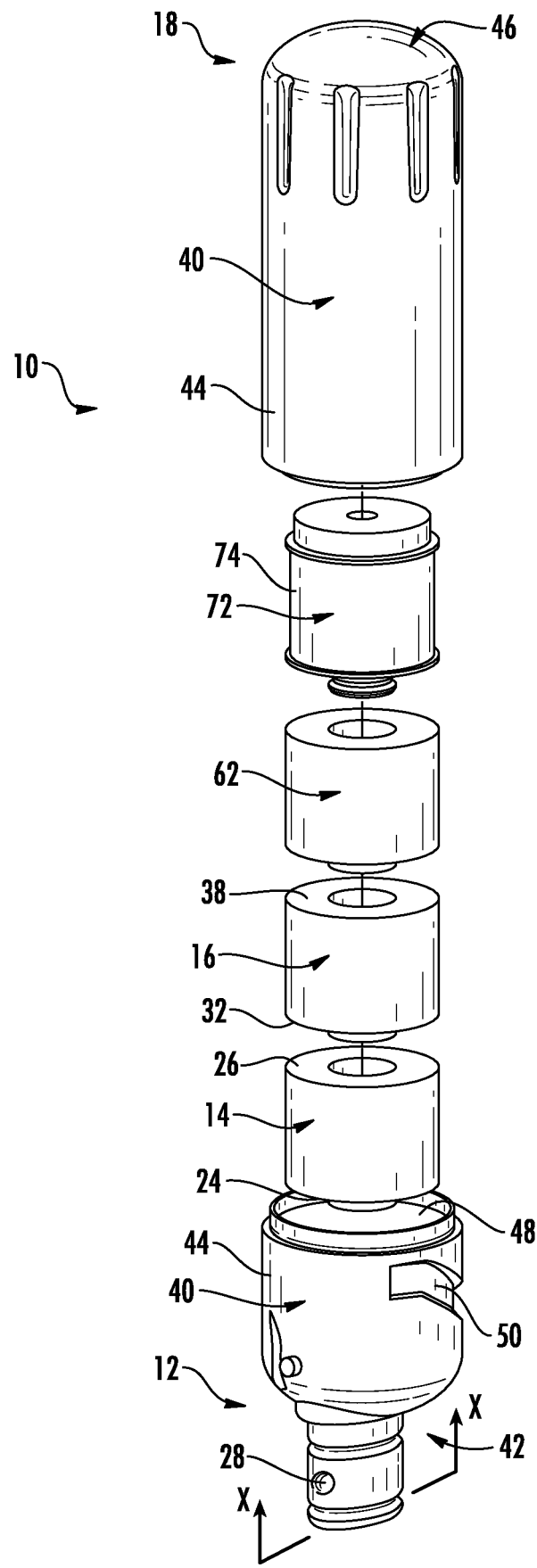
FIG. 4 is an exploded top perspective view of a customizable multi-stage fluid treatment assembly.

Referring to FIG. 4, one embodiment of the multi-stage fluid treatment assembly 10 is shown having the base cartridge 14 and the first variable cartridge 16 arranged to be coaxially spaced within an exterior housing 40 of the fluid treatment assembly 10. The exterior housing 40 is substantially cylindrical shaped and has a water end 42, having the inlet 28 and the outlet 30, for respectively receiving and dispensing the flow of water to and from the appliance or other water source. As such, the connector, as more fully described below, is integrated in the water end 42 of the exterior housing 40 of this embodiment. The water end 42 is configured to receive untreated water through the inlet 28 and dispensing fully treated water through the outlet 30 after it has been treated by at least one treatment medium.

The exterior housing 40 also includes a shell wall 44 extending from the water end 42 to an opposite end 46 of the exterior housing 40, whereby an interior volume 48 of the exterior housing is defined as the interior volume of the tubular shaped shell wall 44. Accordingly, in this embodiment, the cap 18, as more fully described below, may be integrated in the opposite end 46 of the exterior housing 40. The water flow can only enter and exit the interior volume 48 from the water end 42 of the exterior housing 40. However, it is conceived that the substantially cylindrical shape of the exterior housing 40 may alternatively include an oval cross-section cylindrical shape, a rectangular prism shape, and a conical shape, among other shapes and configurations that are configured to encompass at least the base cartridge 14 and the first variable cartridge 16 and are shaped to be received in the receiving cavity 402 of the filter head assembly 400.

As shown in FIG. 4, to assist in engagement of the fluid treatment assembly 10 with the filter head assembly 400, a helical groove 50 may be formed near the water end 42 in the shell wall 44 of the exterior housing 40. Upon installation of the fluid treatment assembly 10, the helical groove 50 engages a peg on the filter head assembly 400 to urge the fluid treatment assembly 10 to rotate when pushed longitudinally into the receiving cavity 402 of the filter head assembly 400 and other conceivable engagement mechanisms. It is also conceivable that the helical groove 50 is not provided and other attachment arrangements are included on the fluid treatment assembly 10.

Figure 5:
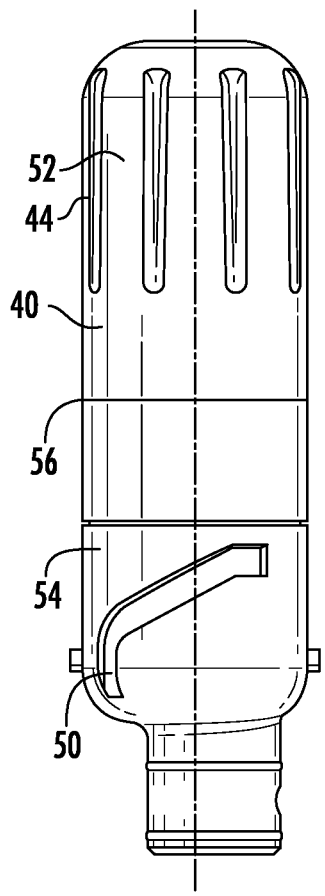
FIG. 5 is a side elevational view of an assembled customizable multi-stage fluid treatment assembly having a first part of a housing attached with a second part of the housing.
Figure 5A:
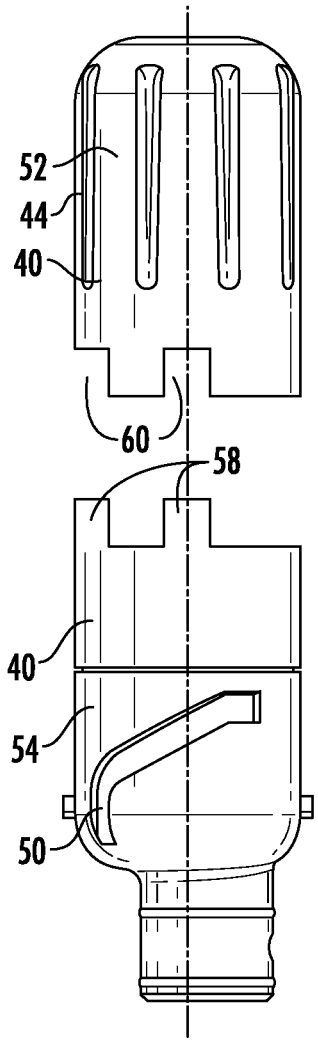
FIG. 5A is a side elevational view of a customizable multi-stage fluid treatment assembly having a first part of the housing detached from a second part of the housing.
Figure 5B:
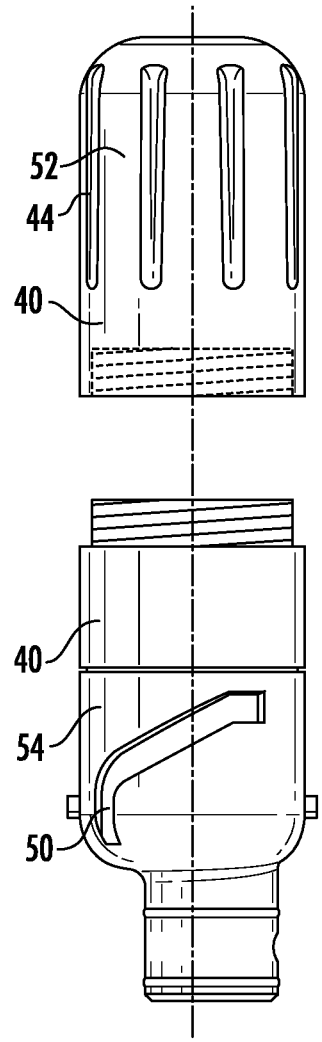
FIG. 5B is a side elevational view of a customizable multi-stage fluid treatment assembly having a first part of the housing detached from a second part of the housing.

As also shown in FIGS. 5-5B, the exterior housing 40 has two segments, including a top end 52 and a bottom end 54. The top end 52 of the exterior housing 40 may be removed to allow access to, removal, and replacement of the plurality of cartridges, allowing for a customized filtering arrangement to be created and maintained without replacing the entire fluid treatment assembly 10. The top end 52 of the exterior housing 40 includes the cap 18 and the bottom end includes the connector 12 of the fluid treatment assembly 10. In addition, the top end 52 is coupled to the bottom end 54 at an intermediate portion 56 of the shell wall 44 of the exterior housing 40; although it is contemplated that the top end 52 may engage the bottom end 54 at another portion on the shell wall 44.

As illustrated in FIG. 5A, the top end 52 may couple to the bottom end 54 to form the exterior housing 40 by a series of tabs 58 on the bottom end 54 that engage a series of slots 60 on the top end 52. The tabs 58 may engage the slots 60 in a snap-fit arrangement or by other engagement features. In place of tabs, other engagement mechanisms, including rounded or angled points or other engagable points can be used. As shown in FIG. 5B, the top end 52 may couple to the bottom end 54 to form the exterior housing 40 by threadable engagement. It is also contemplated that the top end 52 may couple with the bottom end 54 to form the assembled exterior housing 40, as shown in FIG. 5, by other threading or mating features that do not require tools aside from one's hands.

Referring again to FIG. 4, the base cartridge 14 has a base treatment medium 20 spaced within the interior volume 22 of the base cartridge 14, defined between the first end 24 and the second end 26 of the base cartridge 14 and a sidewall 27 of the base cartridge 14. The first and second ends 24, 26 of the base cartridge 14 are configured to receive a fluid, bring the fluid into operative contact with the base treatment medium 20, and dispense the fluid from the opposing end of the base cartridge 14. Further, the first variable cartridge 16 has the first coupler end 32 removably engaged by hand with the second end 26 of the base cartridge 14. As such, the first variable cartridge 16 removably engages the base cartridge 14 by grasping each cartridge and applying a force, such as a linear force, a torque force, or a combination thereof, to removably engage the cartridges. The first variable cartridge 16 has the first filter medium 34 spaced within the first inside volume 36, defined between the first coupler end 32, the first receiver end 38, and a first wall 39 of the first variable cartridge 16. The first coupler and receiver ends 32, 38 of the first variable cartridge 16 are configured to receive the fluid, bring the fluid into operative contact with the first filter medium 34, and dispense the fluid from the first variable cartridge 16. One should appreciate that couplers can be of other orientations and structures as to allow fluid flow.

As shown in the illustrated embodiment of FIG. 4, a second variable cartridge 62 is configured to be removably engaged by hand with the first variable cartridge 16, such that the second variable cartridge 62 is coaxially spaced within the interior volume 48 of the exterior housing 40. As such, the second variable cartridge 62 removably engages the first variable cartridge 16 by grasping each cartridge and applying a force, such as a linear force, a torque force, or a combination thereof, to removably engage the cartridges. Accordingly, the second variable cartridge 62 includes a second coupler end 64 removably engaged with the first receiver end 38 of the first variable cartridge 16, a second receiver end 66, and a second wall 68 extending between the second coupler end 64 and the second receiver end 66 enclosing a second inside volume 70. A second treatment medium 71, or filtering medium, is spaced within the second inside volume 70 between the second coupler end 64 and second receiver end 66, such that the second coupler and second receiver ends 64, 66 of the second variable cartridge 62 are configured to receive the fluid, bring the fluid into operative contact with the second treatment medium, and dispense the fluid from the opposing end of the second variable cartridge 62.

Still referring to the illustrated embodiment in FIG. 4, the multi-stage fluid treatment assembly 10 includes a top filter 72 that has a top filter housing 74 operably connected and configured to be removably engaged and disengaged by hand with the second receiver end 66 of the second variable cartridge 62, such that the top filter 72 is coaxially spaced within an interior volume 48 of the exterior housing 40. As such, the top filter 72 removably engages the second variable cartridge 62 by grasping the cartridge and filter and applying a force, such as a linear force, a torque force, or a combination thereof, to removably engage the same. However, it is conceivable that the top filter 72 may alternatively engage the first variable cartridge 16 if the second variable cartridge 62 is not used or if the first variable cartridge 16 is sized to consume the space in the interior volume 48 of the exterior housing 40 occupied by the second variable cartridge 62. Further, it is contemplated that the top filter 72 may alternatively engage a third variable cartridge if three variable cartridges are configured to occupy the interior volume 48 of the exterior housing 40. In addition, it is contemplated that the top filter 72 may engage the variable cartridge of a plurality of variable filter cartridges most distal from the connector.

As shown in FIG. 4, the top filter 72 includes the top filter housing 74 having a substantially porous top wall 76, a top coupler end 78, a top receiver end 80, and an interior conduit 82 configured to conduct water from the top filter 72 to the engaged variable cartridge. The top wall 76 of the top filter 72 is water permeable or comprised a plurality of holes that allow water to move from outside the top filter housing 74 into an interior of the top filter housing and into operative contact with a top water treatment medium 84 spaced therein. The top filter water treatment medium 84 is water permeable and configured to treat water received. The interior conduit 82 is operably connected proximate to the top coupler end 78 to the second variable cartridge 62 proximate to the second receiver end 66, or other variable cartridge, and in operation, allows water treated by the top filter water treatment medium 84 to engage the second treatment medium 71 of the second variable cartridge 62, as shown in FIG. 6, or the treatment medium of the other engaged variable cartridge.

The at least one treatment medium within the base cartridge 14, first variable cartridge 16, second variable cartridge 62, and top filter 72, among other potential or alternative cartridges, may comprise material configured to treat water, especially water for human consumption, chosen from a treatment group consisting of filtering particulate matter from the water, adding a descaling agent to the water, adding vitamins to the water, adding minerals to the water, adding a pharmaceutically active agent, purifying the taste of the water, removing odor from the water, and altering the color of the water, or mixtures thereof. The descaling agents that may be added to the fluid by the treatment medium may be chosen from the group consisting of organic acid, inorganic acid, sulfonic acid, carboxylic acid, lactic acid, acetic acid, formic acid, oxalic acid, uric acid, phosphoric acid, hydrochloric acid, sulfamic acid, and mixtures thereof. The water treatment medium contained in individual cartridges may also be chosen from the group consisting of: carbon (e.g., activated carbon particles, such as mesoporous activated carbon, carbon powder, particles sintered with a plastic binder, carbon particles coated with a silver containing material, or a block of porous carbon); ion exchange material (e.g., resin beads, flat filtration membranes, fibrous filtration structures, etc.); zeolite particles or coatings (e.g., silver loaded); polyethylene; charged-modified, melt-blown, or microfiber glass webs; alumina; aluminosilicate material; and diatomaceous earth. The water treatment medium may also be impregnated or otherwise disposed on a porous support substrate, such as a fabric material, a paper material, a polymer screen, or other conceivable porous structures that may be contained in the individual cartridges, which in some instances may be configured to allow the fluid to flow across the support substrate and not through the support substrate.

Figure 6:
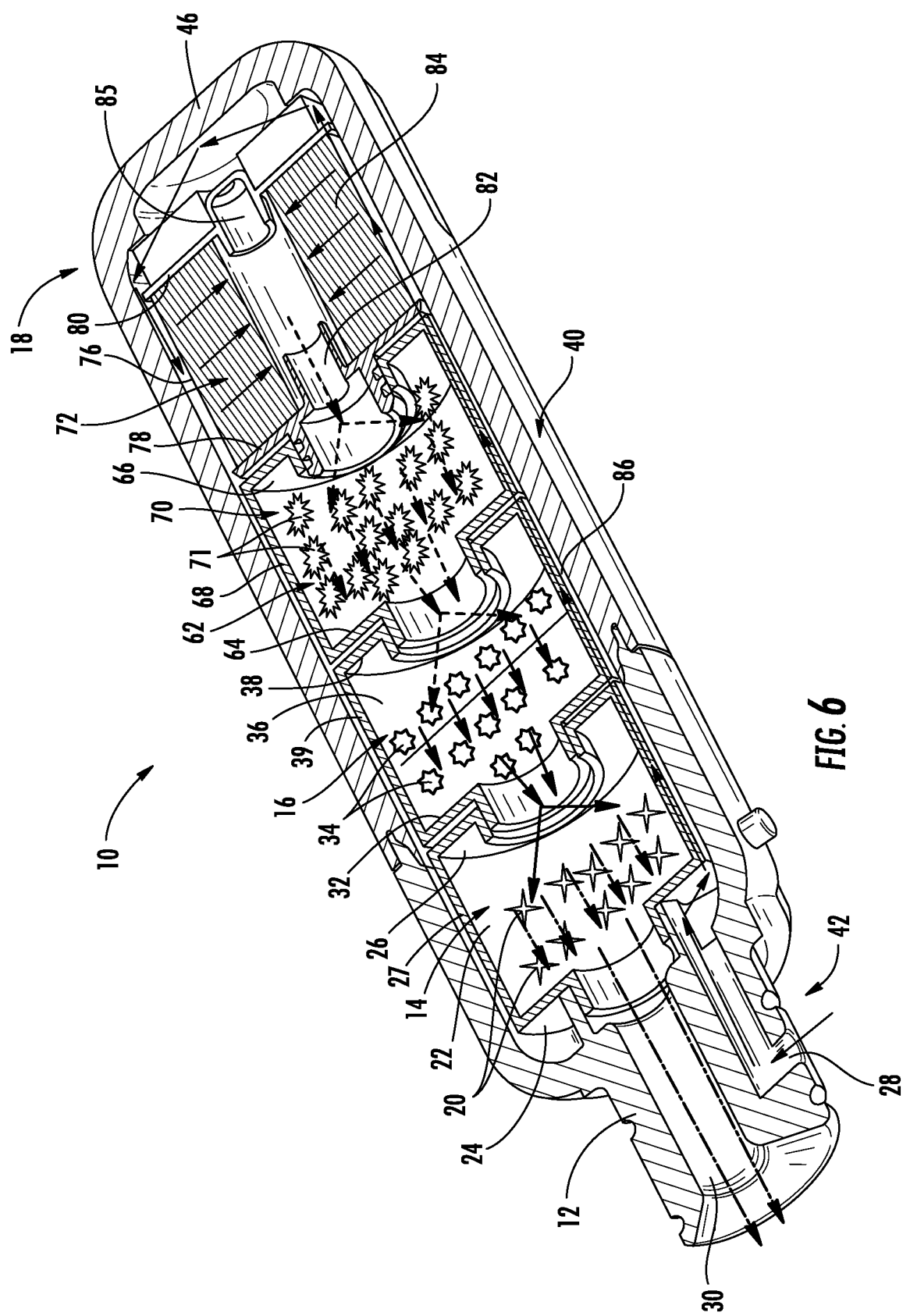
FIG. 6 is a cross-sectional top perspective view of a customizable multi-stage fluid treatment assembly taken along line X-X of FIG. 4.

As illustrated in FIG. 6, a plurality of water treatment cartridges, illustrated to include the base cartridge 14, the first variable cartridge 16, the second variable cartridge 62, and the top filter 72, are spaced coaxially and sized to fit within the interior volume 48 of the exterior housing 40. A water flow channel 86 is defined between the plurality of water treatment cartridges and the exterior housing 40. More specifically, the sidewall 27 of the base cartridge 14, the first wall 39 of the first variable cartridge 16, and the second wall 68 of the second variable cartridge 62 together form a sealed inside wall of the channel 86. The outside wall of the channel, in this embodiment, is formed with the inner surface of the exterior housing 40. The water flow channel 86 extends from the inlet 28 to the opposite end 46 of the exterior housing 40. The top filter 72 includes a plug 85 that restricts the water flow from entering the top of the top filter 72 and instead urges the water flow to enter the top wall 76 of the top filter 72.

Still referring to FIG. 6, the water flow channel 86 is formed from a space between the exterior housing 40 of the base cartridge 14 and the variable cartridge or cartridges spaced within the interior volume 48 of the housing 40. The channel 86 also extends between the inlet 28 and the opposite end 46 of the exterior housing 40. In operation, the channel 86 is configured to allow a water flow to travel in a closed circuit to and from the water end 42 of the exterior housing 40, such that the water flow enters through the inlet 28, subsequently travels through the channel 86 to the opposite end 46 of the exterior housing, subsequently enters the top filter 72, typically through the top wall 76, subsequently travels into the second variable cartridge 62 through the conduit 82 of the top filter 72, subsequently interacts with and passes though the second treatment medium 71, subsequently enters the first variable cartridge 16, subsequently interacts and passes through the first treatment medium 34, subsequently enters the base cartridge 14, subsequently interacts with and passes through the base treatment medium 20, and finally exits the fluid treatment assembly 10 though the outlet 30 as treated water. It is also conceived that the water flow travels in a reverse order from that described above, wherein the outlet 30 functions as the inlet 28 and the inlet functions as the outlet on the connector 12.

Figure 6A:
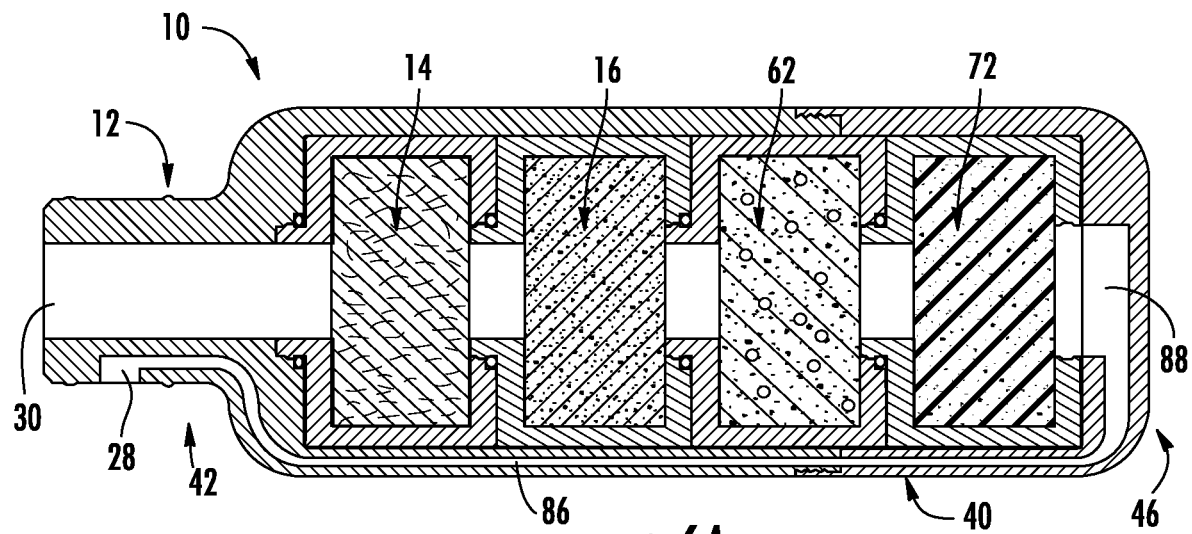
FIG. 6A is a cross-sectional side view of an additional embodiment of a customizable multi-stage fluid treatment assembly.
Figure 6B:
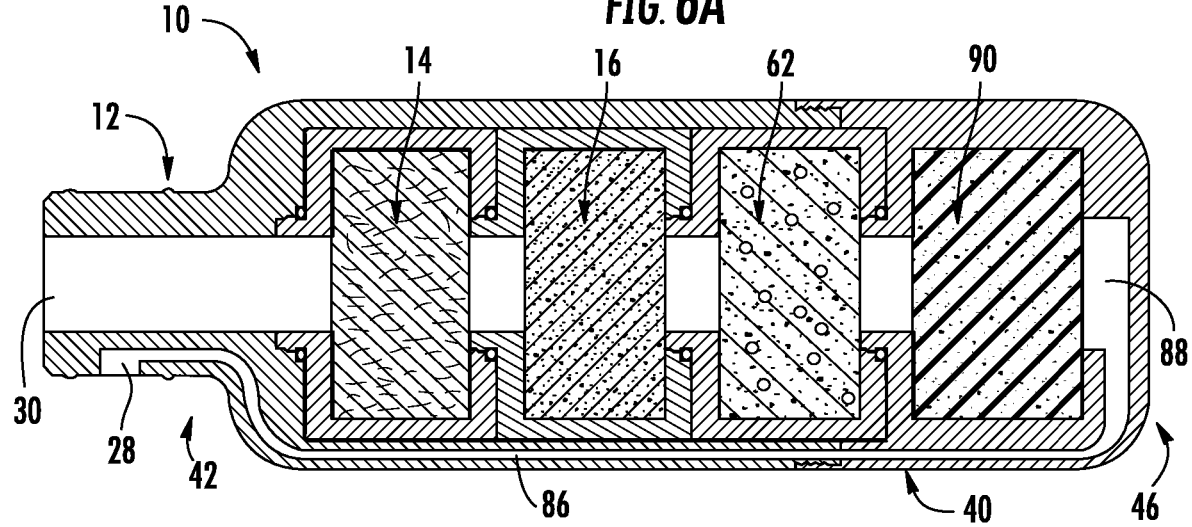
FIG. 6B is a cross-sectional side view of an additional embodiment of a customizable multi-stage fluid treatment assembly.

Additional embodiments of the channel 86, among other things, are illustrated in FIGS. 6A-6D. More specifically, as shown in FIGS. 6A and 6B, the channel 86 extends within the exterior housing 40 between the outer surface of the exterior housing 40 and the inner surface of the exterior housing 40. As shown in FIG. 6A, the channel 86 extends within the exterior housing 40 from the inlet 28 of the connector 12 on the water end 42 of the exterior housing 40, through the shell wall 44, and to the opposite end 46 of the exterior housing 40. In FIG. 6A the channel 86 extends to a central cavity 88 positioned coaxial in relation to the variable cartridges; however, it is contemplated that the channel 86 may extend to other positions at the opposite end 46 of the exterior housing 40. In FIG. 6B, a top filter 90, or conceivably any other variable cartridge, is integrated with the opposite end 46 of the exterior housing 40, and as such a treatment medium is spaced within the opposite end 46 of the exterior housing. In such arrangement the channel 86 extends beyond the integrated top filter 90 and treatment medium to a similarly positioned central cavity 88.

Figure 6C:
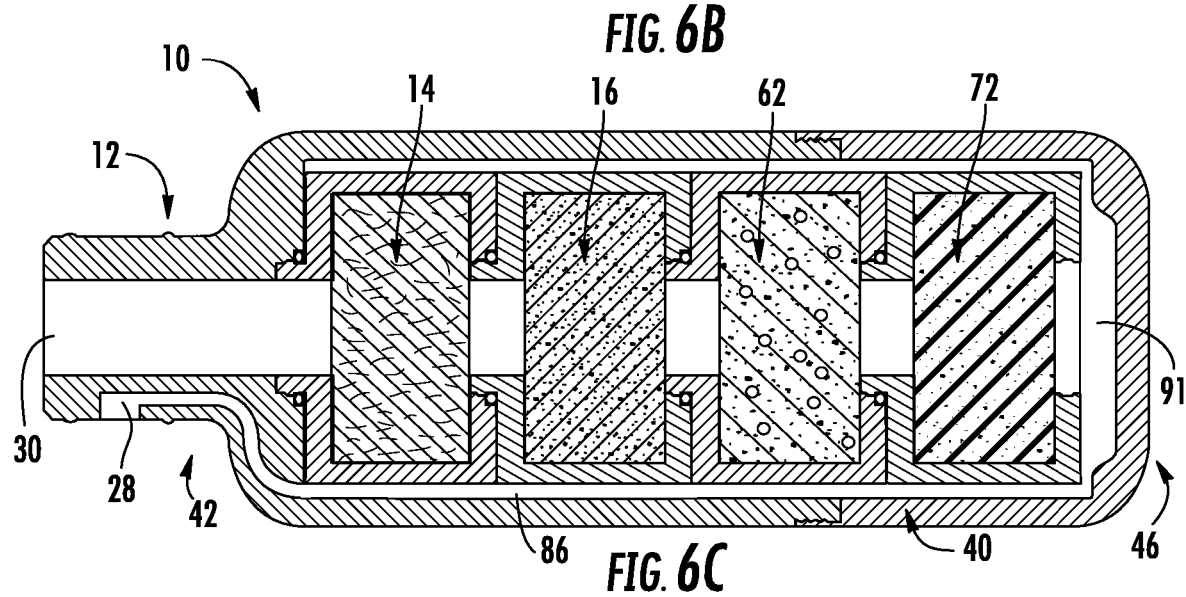
FIG. 6C is a cross-sectional side view of an additional embodiment of a customizable multi-stage fluid treatment assembly.
Figure 6D:
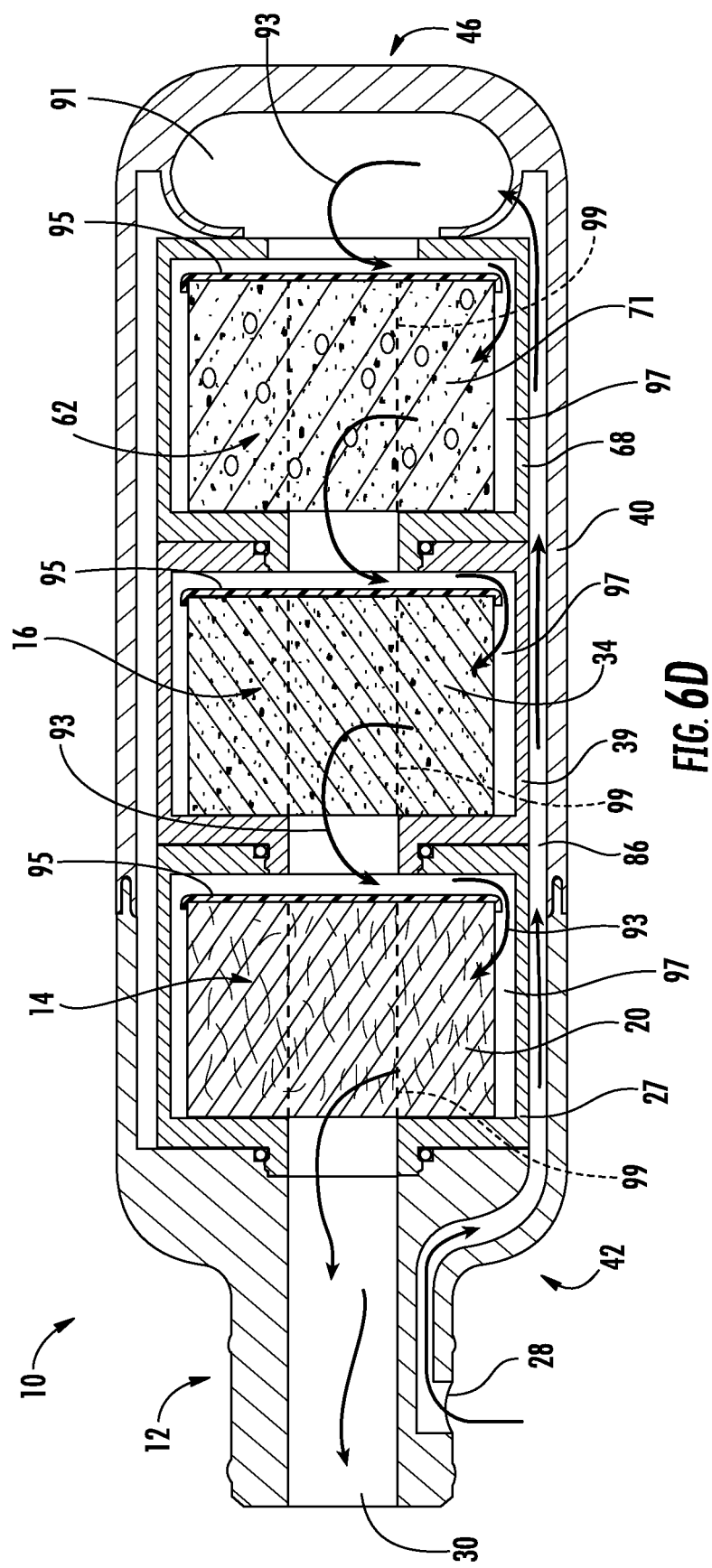
FIG. 6D is a cross-sectional side view of an additional embodiment of a customizable multi-stage fluid treatment assembly.

As shown in FIGS. 6C-6D, the channel 86 is formed as previously described and illustrated in FIG. 6, between the sealed inside wall created by the plurality of cartridges and the outside wall created by the inner surface of the exterior housing 40. The channel 86 in FIGS. 6C-6D, is shown extending to a cavity 91 at the top receiver end 80 of the top filter 72, or conceivably another variable cartridge. The cavity 91 is shaped to re-direct the water flow in the opposite direction from the direction at which the water flow enters the cavity 91.

The plurality of cartridges illustrated in FIG. 6D are similarly arranged to include the base cartridge 14, the first variable cartridge 16, and the second variable cartridge 62. However, the plurality of cartridges are alternatively constructed to direct a path 93 of the water flow in a substantially serpentine shape through the plurality of cartridges between the cavity 91 of the opposite end 46 and the outlet 30. More specifically, each of the plurality of cartridges, as shown in FIG. 6D include a top covering 95 disposed over each of the base treatment medium 20, the first filter medium 34, and the second treatment medium 71 and include a gap 97 formed between the sidewall 27 of the base cartridge 14, the first wall 39 of the first variable cartridge 16, the second wall 68 of the second variable cartridge 62 and the circumference of each of the base treatment medium 20, the first filter medium 34, and the second treatment medium 71. It is conceived that the top covering 95 may be an extruded polymer material or an alternatively integrated dense material that is at least substantially impervious, more typically completely impervious, to water flow into the filter or treatment medium.

Figure 6E:
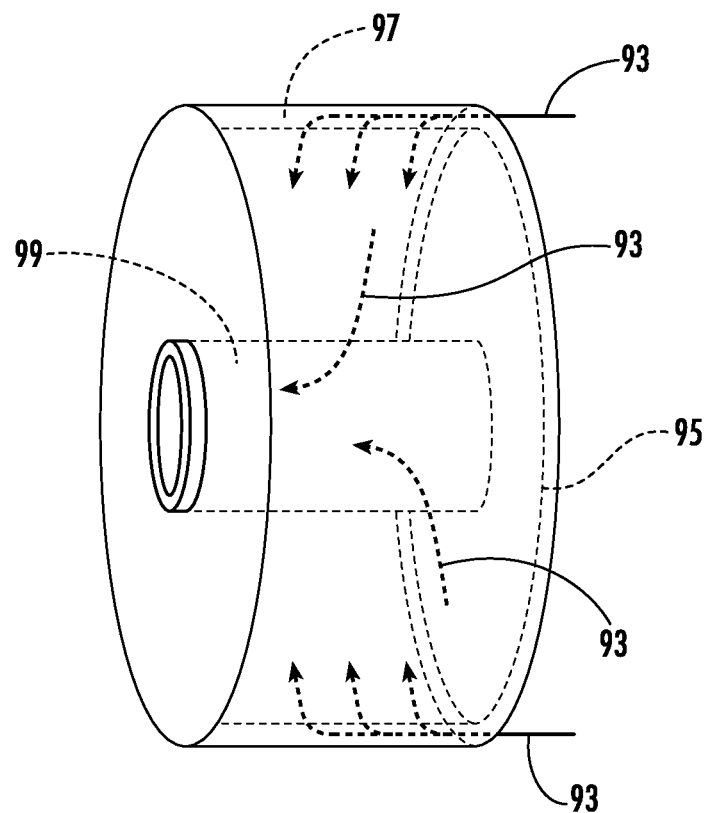
FIG. 6E is a top perspective view of a cartridge of the customizable multi-stage fluid treatment assembly as shown in FIG. 6D.

Accordingly, as shown in FIG. 6E, the top covering 95 directs the path 93 of the water flow radially outward toward the sidewall of the respective cartridge and into the gap 97. The water flow is then directed radially inward through the porous treatment or filter medium of the respective cartridge and into a hollow central conduit 99 to direct the path 93 of the water flow to the next cartridge or the outlet 30. As illustrated in FIG. 6D, in operation, the path 93 of the water flow enters through the inlet 28, subsequently travels through the channel 86 to the opposite end 46 of the exterior housing, subsequently enters the cavity 91 and re-directs the general direction of the water flow, subsequently travels into the second variable cartridge 62 and radially outward into the gap 97, subsequently travels radially inward and interacts with and passes though the second treatment medium 71, subsequently enters the first variable cartridge 16 and radially outward into the gap 97, subsequently travels radially inward and interacts and passes through the first treatment medium 34, subsequently enters the base cartridge 14 and radially outward into the gap 97, subsequently travels radially inward and interacts with and passes through the base treatment medium 20, and finally exits the fluid treatment assembly 10 though the outlet 30 as treated water. It is also conceived that the water flow may travel in a reverse order/direction from that described above, wherein the outlet 30 on the connector 12 functions as the inlet and the inlet 28 on the connector 12 functions as the outlet.

As further illustrated in FIGS. 7-8, an additional embodiment of the multi-stage fluid treatment assembly 10 is shown, wherein the fluid treatment assembly 10 includes a base cartridge 94, a connector 92, at least one variable cartridge 96, 98, and a cap 100 that together function to provide a sealed housing 102 that is configured to engages the filter head assembly 400, eliminating the exterior housing 40. The base cartridge 94, the first variable cartridge 96, and the second variable cartridge 98 are similar to those described above, however, they are renumbered for the illustrated embodiment.

Figure 8A:
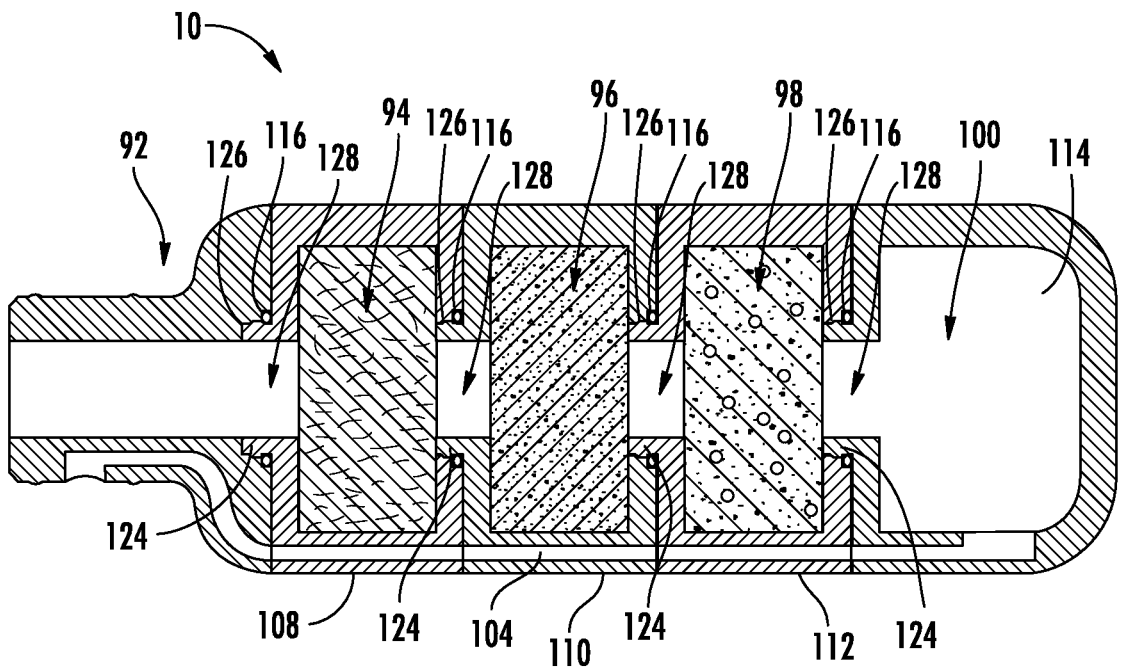
FIG. 8A is a cross-sectional side view of the assembled customizable multi-stage fluid treatment assembly taken along line Y-Y of FIG. 8.
Figure 8B:
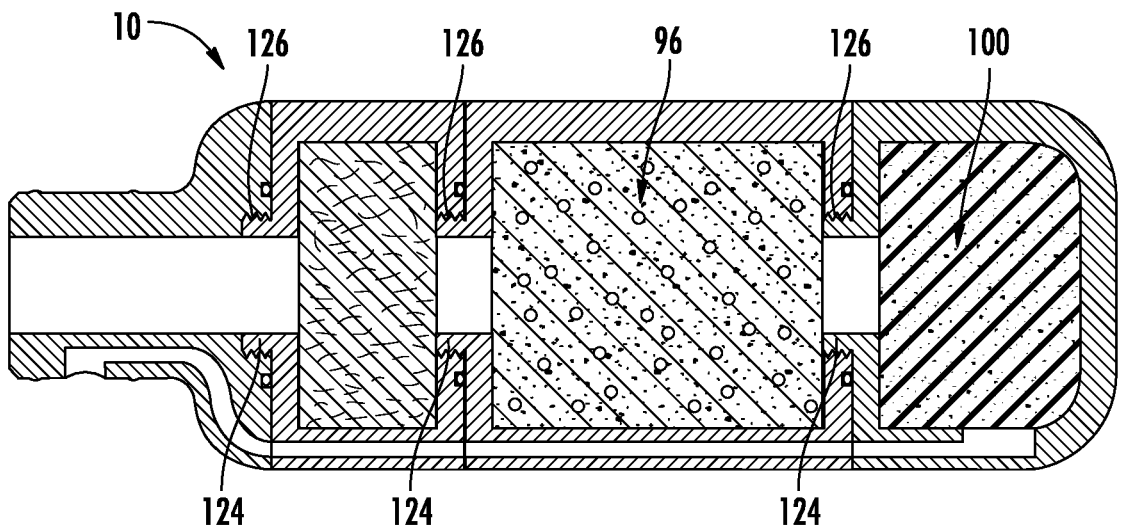
FIG. 8B is a cross-sectional side view of an additional embodiment of a customizable multi-stage fluid treatment assembly.

Referring to FIG. 7, a water flow channel 104 extends between the inlet 28 of the connector 92 and the cap 100. The cap 100 is coupled with the second receiver end 106 of the second variable cartridge 98 and encloses the sealed housing 102 that is formed within the sidewall 108 of the base cartridge 94, the first wall 110 of the first variable cartridge 96, and the second wall 112 of the second variable cartridge 98. The cap 100 is configured to direct the fluid to flow between the channel 104 and the second variable cartridge 98, or any other cartridge directly engaged to the cap 100. It is conceivable that the cap 100 may also include a pre-filter or a top filter disposed therein, or another variable cartridge disposed therein, for filtering the water flow. However, as shown in FIG. 8A, the cap 100 may simply provide a void 114 to direct the water flow from the channel 104 to the second variable cartridge 98. Similarly, as shown in FIG. 8B, the cap 100 is integral with the second variable cartridge 98, such that the first variable cartridge 96 is elongated to facilitate the depth 408 of the filter head assembly 400 of an appliance 300.

Figure 8C:
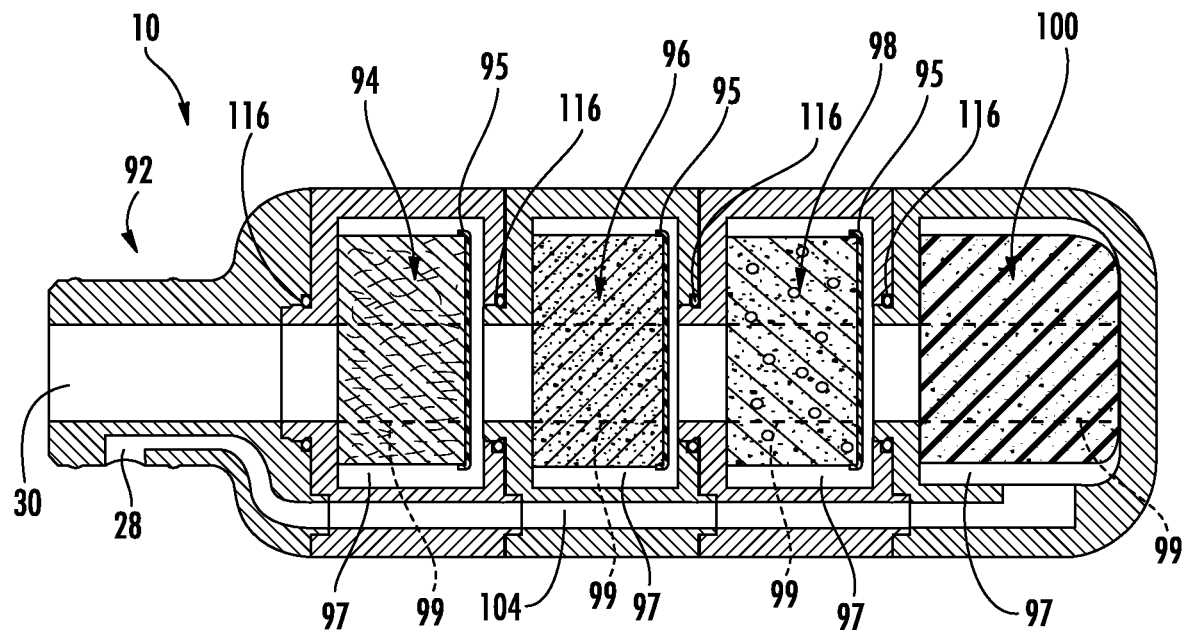
FIG. 8C is a cross-sectional side view of an additional embodiment of a customizable multi-stage fluid treatment assembly.
Figure 8D:
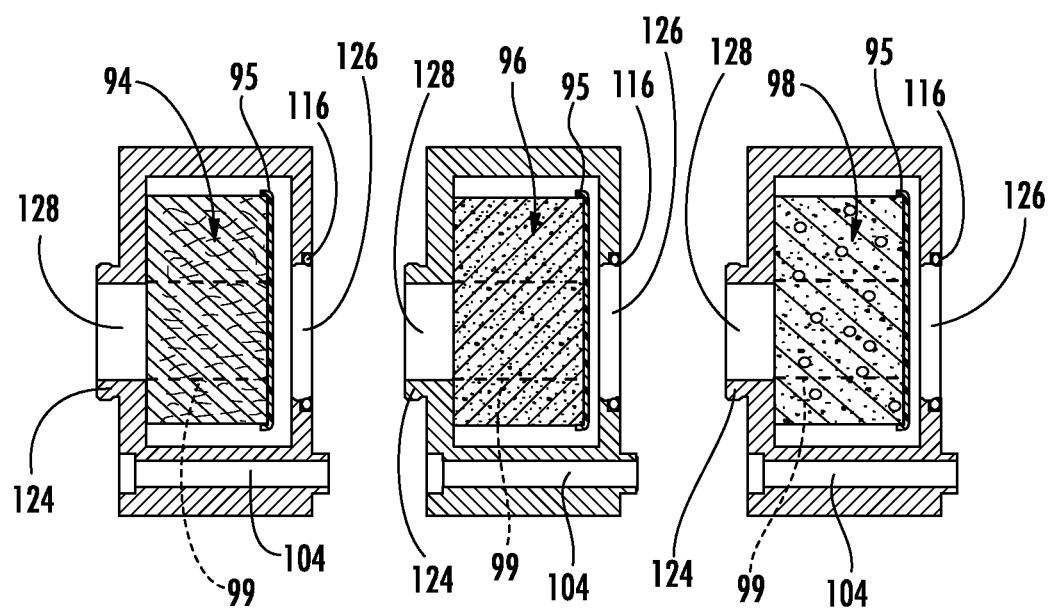
FIG. 8D is a cross-sectional side view of the disassembled cartridges of the customizable multi-stage fluid treatment assembly as shown in FIG. 8C.

As shown in the embodiments of FIGS. 7-8D, the channel 104 is formed within the sealing housing 102 between the inlet 28 of the connector 92 and the cap 100, such that segments of the channel 104 are provided in each of the base cartridge 94, the first variable cartridge 96, and the second variable cartridge 98. The channel 104 is configured to allow the water flow to travel in a close circuit within the channel 104, the at least one variable cartridge 96, and the base cartridge 94 deliver the treated water back to the appliance. As shown in FIG. 7, the segments of the channel 104 encompass approximately half of the circumference of each of the connector 92, the base cartridge 94, the first variable cartridge 96, and the second variable cartridge 98. However, it is conceivable that the channel 104 encompasses a larger or smaller portion of the above referenced circumferences. Significantly, the channel 104 segments may also be customized for each of the base cartridge 94, the first variable cartridge 96, and the second variable cartridge 98, such that a flow rate through the channel 104, and in turn though the fluid treatment assembly 10, is adjustable by selecting a cartridge with a varied channel segment based upon the type and flow rate requirements for the treatment medium of the cartridge. This notable additional feature is explained in more detail below.

As further illustrated in FIG. 7, a plurality of o-rings 116 are provided between each of the connector 92, the base cartridge 94, the first variable cartridge 96, the second variable cartridge 98, and the cap 100 to assist in forming a water tight seal upon assembly of the sealed housing 102 of the fluid treatment assembly 10, as shown in FIG. 8. The o-rings 116 may comprise a plastic or elastomeric material, such as rubber, that may be compressed upon assembly. It is contemplated that the relative position of the o-rings 116 with respect to the channel 104 segments may be varied on each of the connector 92, the base cartridge 94, the first variable cartridge 96, the second variable cartridge 98, and the cap 100 to maintain a water tight seal.

Referring now to FIG. 8, the base cartridge 94, the first variable cartridge 96, and the second variable cartridge 98 are coaxially coupled to each other, such that they may be detached by grasping and pulling or rotating them in relation to each other. Further, the base cartridge 94, the first variable cartridge 96, and the second variable cartridge 98 are coaxially coupled to form a cylindrical shape of the sealed housing 102, having the sidewall 108 of the base cartridge 94, first wall 110 of the first variable cartridge 96, and the second wall 112 of the second variable cartridge 98 substantially aligned. It is conceived that the individual lengths of the at least one base cartridge 94, the at least one variable filter cartridge 96, 98, and the cap 100 may be adjusted to elongate or shorten the multi-stage fluid treatment assembly 10 to be received in the depth 408 of the receiving cavity 402 of the filter head assembly 400 (FIG. 3). For instance, the cap 100 may be removably engaged with a select one of the end 118 of the connector 92, the second end 120 of the base cartridge 94, the first receiver end 122 of the first variable cartridge 96, and the second receiver end 106 of the second variable cartridge 98 to provide the sealed housing 102 that is configured to removably engage the filter head assembly 400 of an appliance 300. Thereby the cap 100 may include an elongated portion devoid of a treatment medium, such that the sealed housing 102 is sized to span the depth 408 of the receiving cavity 402 of the filter head assembly 400 sufficient to allow a user to grasp the cap 100 and install the connector 92 into engagement with the filter head assembly 400 (FIG. 3). The elongated portion may include a laterally extending latch assembly for detachably engaging a receptor within the filter head assembly 400 (FIG. 3).

The plurality of cartridges, as shown in FIGS. 8A-8D, include an extension 124 and a corresponding opening 126 to engage the extension 124 between each of the plurality of cartridges. A flow passage 128 is provided through the center of the extension 124 to permit the flow of water to travel between the treatment medium spaced within each cartridge in an opposite direction than the water flow through the channel 104. More specifically, as shown in FIG. 7, a first extension 130 is provided on the first end 119 of the base cartridge 94 to engage and couple with a first opening 132 on the connector 92. Accordingly, a second extension 134 and a third extension 136 are respectively provided on the first coupler end 121 of the first variable cartridge 96 and the second coupler end 123 of the second variable cartridge 98 to engage and couple respectively with a second opening 138 on the second end 120 of the base cartridge 94 and a third opening 140 on the first receiver end 122 of the first variable cartridge 96.

As illustrated in FIGS. 8C-8D, the plurality of cartridges are similarly arranged to include segments of the channel 104 extending through each of the base cartridge 94, the first variable cartridge 96, the second variable cartridge 98, and the cap 100. The embodiments shown in FIGS. 8C and 8D, however, include the top cover 95 and the gap 97 as included in FIGS. 6D and 6E. Accordingly, the water flow has a substantially serpentine shape through the plurality of cartridges between the cap 100 and the outlet 30. As such, the top covering 95 directs the water flow radially outward toward the sidewall of the respective cartridge and into the gap 97. The water flow is then directed radially inward through the porous treatment or filter medium of the respective cartridge and into the hollow central conduit 99 to direct the water flow to the next cartridge or the outlet 30.

In operation of the embodiment of FIG. 8C, the water flow enters through the inlet 28, subsequently travels through the channel 104 to the cap 100, subsequently travels radially inward and interacts with and passes though the treatment medium in the cap 100 into the central conduit 99, subsequently travels into the second variable cartridge 98 and radially outward into the gap 97, subsequently travels radially inward and interacts with and passes through the second treatment medium 71 into the central conduit 99, subsequently enters the first variable cartridge 96 and radially outward into the gap 97, subsequently travels radially inward and interacts and passes through the first treatment medium 34 into the central conduit 99, subsequently enters the base cartridge 94 and radially outward into the gap 97, subsequently travels radially inward and interacts with and passes through the base treatment medium 20, and finally exits the fluid treatment assembly 10 though the outlet 30 as treated water. It is also conceived that the water flow may travel in a reverse order/direction from that described above, wherein the outlet 30 functions as the inlet and the inlet 28 functions as the outlet.

As illustrated in FIGS. 8A-8C, the extensions 124 and openings 126 are in a snap-fit arrangement that are configured to allow a user to frictionally engage and disengage the cartridges with each other by hand without the use of tools and to form a water-tight seal capable of withstanding water pressure traveling through the fluid treatment assembly 10 from an appliance or other water source. As illustrated in FIG. 8B, the extensions 124 and openings 126 may also be configured in a threadably connected configuration allowing a user by hand without the use of tools to engage and disengage the cartridges with each other and thereby form a water-tight seal capable of withstanding water pressure from an appliance or other water source. Accordingly, the cartridges removably engage and disengage each other by grasping the opposing cartridge and applying a force, such as a linear force, a torque force, or a combination thereof, between the cartridges to removably engage or disengage each other. The extensions 124 and openings 126 are shown as cylindrical shaped, however, they may comprise additional or alternative shapes, including a rectangular prism shape or a conical shape.

Figure 8E:
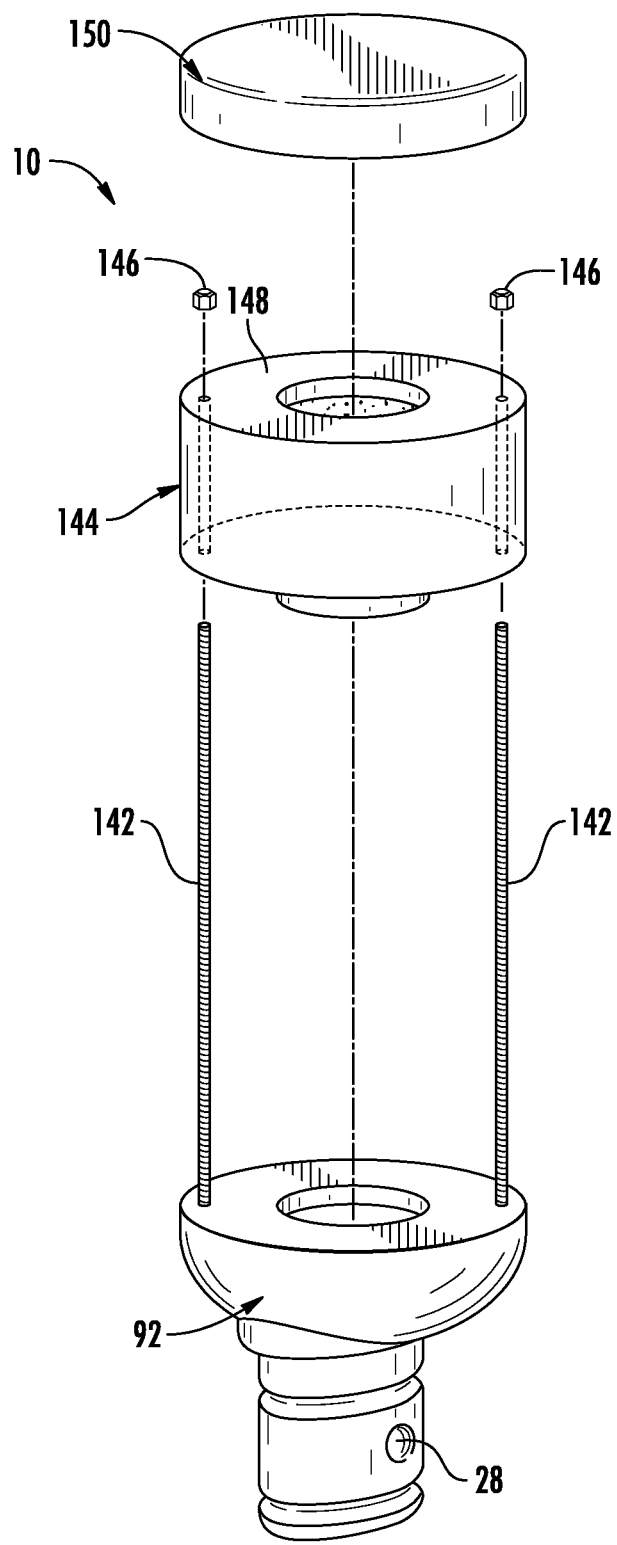
FIG. 8E is an exploded top perspective view of an additional embodiment of a customizable multi-stage fluid treatment assembly.

Another feature that may be used to ensure a stable and water-tight connection between the cartridges is shown in FIG. 8E. In this embodiment, a pair of threaded rods 142 extend longitudinally from the connector 92, through each cartridge, and beyond a cartridge 144 most distal from the connector 92. A lock nut 146 is screwed down on each rod 142 to engage a top surface 148 of the cartridge 144 most distal from the connector 92, compressing the o-rings 116 and securing the cartridges in a water-tight connection. The cap 150 is placed over the top surface of the distal cartridge 144 to contain water in the fluid treatment assembly 10 and adapt the shape of the fluid treatment assembly 10 to engage the filter head assembly 400. It is also conceivable that one or more than the pair of rods 142 may extend from the connector 92 and through the cartridges to secure the cartridges together in a water-tight connection.

As further illustrated in FIG. 9, an additional embodiment of the fluid treatment assembly 10 is shown, wherein the fluid treatment assembly 10 includes a keyed mating arrangement 152. The keyed mating arrangement is disposed between each of a connector 154, a base cartridge 156, a first variable cartridge 158, a second variable cartridge 160, and a cap 162. The keyed mating arrangement 152 is configured to allow the plurality of cartridges including the base cartridge 156, the first variable cartridge 158, and the second variable cartridge 160, to matingly engage in a fluid tight manner exclusively in the order illustrated, such that, for example, the second variable cartridge 160 may not be directly engaged with the base cartridge 156 without first including the first variable cartridge 158 between the base cartridge 156 and the second variable cartridge 160. This keyed mating arrangement 152 ensures that the plurality of cartridges are assembled in the correct order, as the order of filtering or fluid treatment, in some cases, must be performed in a specific sequence to realize the filtering or treatment benefits of each treatment medium of each cartridge.

The keyed mating arrangement 152, in the embodiment as illustrated in FIG. 9, more specifically includes at least one recess 164 and at least one protrusion 166 configured to matingly engage the corresponding at least one recess 164. As shown, a first keyed mating arrangement 168 between the connector 154 and the base cartridge 156 includes three longitudinally extending protrusions 170 on the connector 154 configured to matingly engage three recesses 172 formed on the first end 174 of the base cartridge 156. Further, a second keyed mating arrangement between the base cartridge 156 and the first variable cartridge 158 includes four longitudinally extending protrusions 178 on the second end 180 of the base cartridge 156 configured to matingly engage four recesses 182 formed on the first connector end 184 of the first variable cartridge 158. A third keyed mating arrangement 186 between the first variable cartridge 158 and the second variable cartridge 160 includes five longitudinally extending protrusions 188 on the first receiver end 190 of the first variable cartridge 158 that are configured to matingly engage five recesses 192 formed on the second connector 194 end of the second variable cartridge 160. In further sequence, a fourth keyed mating arrangement 196 between the second variable cartridge 160 and the cap 162 includes six longitudinally extending protrusions 198 on the second receiver end 200 of the second variable cartridge 160 that are configured to matingly engage six recesses 202 formed on the cap 162.

As shown in FIGS. 9A-9D, an additional embodiment of the recesses 165 and protrusions 167 of the keyed mating arrangement 152 is illustrated. The protrusions 167 include a neck portion 169 that extends from the cartridge to a head portion 171 having a larger diameter than the neck portion 169. The head portion 171 is configured to engage a corresponding recess in another cartridge, similar to the recesses 165 illustrated on the opposing end of the cartridge from the protrusions 167. The recesses 165, as illustrated, typically include a cylindrical hole 173 with a slot 175 extending from the base of the cylindrical hole 173 in a circumferential direction relative cartridge. The slot 175 allows for lateral movement of a head portion 171 of a corresponding protrusion, and a crevice 177 extends in alignment with the slot 175 to allow for movement of a neck portion 169 of the corresponding protrusion. When the corresponding head portion is inserted into the cylindrical hole 173 and the cartridge and corresponding cartridge are twisted in opposing directions, the head portion moves laterally in the slot 175, causing a camming action to lock the head in engagement with the slot 175. It is also conceivable that the keyed mating arrangement may be configured for an opposing lateral movement between the cartridge and corresponding cartridge to engage the same.

More specifically, as shown in FIG. 9B, the slot 175 is angled to slightly over compress the o-ring 116 when the corresponding head portion is at the apex of the slot and to draw the corresponding head portion down at an end of the slot 175 to cause a substantially optimal o-ring 116 compression and avoid over compression. This keyed making arrangement embodiment also allows the channel 104 to be in alignment when the cartridges are engaged. It is also conceivable that the protrusions 167 and recesses 165 of the keyed mating arrangement 152 may additionally or alternatively include embodiments with slots to provide a threaded engagement between the cartridges upon opposing twisting movement of engaging cartridges. In addition, the keyed mating arrangement may include any number, shape, or orientation of mating arrangement, such as between a protrusion and a recess, opposing positive and negative embossments, or a protuberance and a relief.

The first, second, third, and fourth keyed mating arrangements 168, 176, 186, 196 are configured so they cannot engage with each other. For instance, if the first and second variable cartridges 158, 160 were to be integrated into the base cartridge 156, such an elongated base cartridge must have the first keyed mating arrangement 168 recesses 172 on the first end to correspond with the connector 154 and the fourth keyed mating arrangement 196 protrusions 198 on the second end to correspond with the cap 162. It is conceived that the keyed mating arrangements may include, among other things, various shaped protrusions and mating recesses. Further it is contemplated that the extensions 124 and openings 126, as shown in FIG. 8A, for the flow path 128 between the cartridges may integrate keyed mating arrangements to require a specific order of the plurality of cartridges. In this manner, for example, if a water treatment cartridge functions to add nutritive components such as vitamins, minerals, pharmaceuticals, and/or nutraceuticals (glucisomial and or chondroitin, for example), the keyed mating arrangement would ensure that the nutritive additive water treatment cartridge functions after a water treatment cartridge that functions to remove impurities thereby avoiding a misalignment of the cartridges and ensuring the additives are not added to the water only to be removed by another water treatment cartridge.

Still referring to the additional embodiment in FIG. 9, the channel 104 is shown as a cylindrical passage 204 extending from the inlet 28 in the connector 154, longitudinally extending through each cartridge, and extending through the cap 162 to a central cavity 88 positioned coaxial in relation to the plurality of cartridges. It is conceivable that the cap 162 may also include a pre-filter or a top filter disposed therein, or another variable cartridge disposed therein, for filtering the water flow. However, as shown in FIG. 8A, the cap 100 may simply provide a void 114 to direct the water flow from the channel 104 to the second variable cartridge 98. Cylindrical channel segments 205 of the cylindrical passage 204 are formed in each cartridge and extend within the sidewall of the base cartridge 156, the first wall of the first variable cartridge 158, and the second wall of the second variable cartridge 160, between the outer surface of the sealed housing 102 and the treatment medium spaced within each cartridge. Upon assembly and operation of the fluid treatment assembly 10, each channel segment 205 is substantially aligned to create the continuous channel from the inlet 28 to the cap 162. It is again contemplated that the channel 104 may have an alternative shape or configuration from the cylindrical passage 204, such as the channel 104 as illustrated in FIG. 7.

Figure 10B:
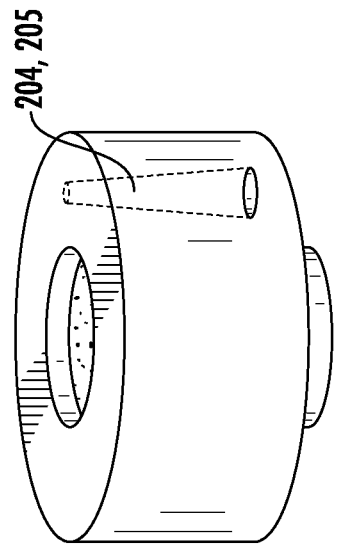
FIG. 10B is a top perspective view of a cartridge of an embodiment of a customizable multi-stage fluid treatment assembly.
Figure 10A:
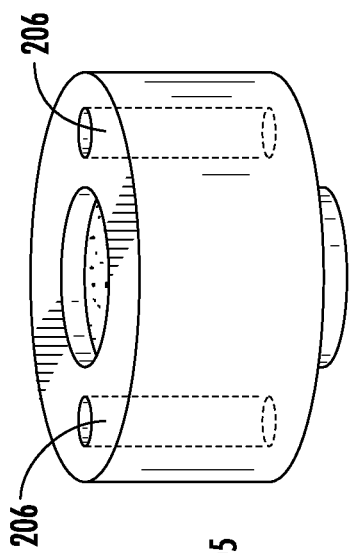
FIG. 10A is a top perspective view of a cartridge of an embodiment of a customizable multi-stage fluid treatment assembly.
Figure 10:
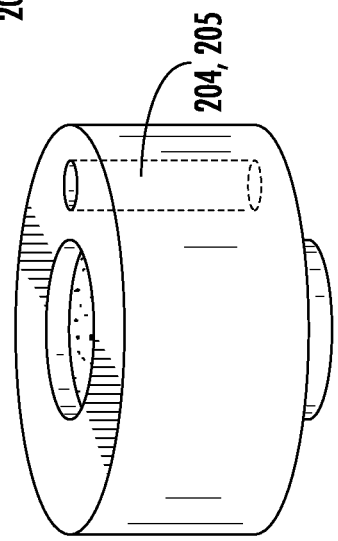
FIG. 10 is a top perspective view of a cartridge of an embodiment of a customizable multi-stage fluid treatment assembly.

As shown in FIG. 10, the cartridge channel segment 205 may also have a larger diameter relative to the diameter of other portions of the cylindrical passage 204 as shown in FIG. 9, to configure the rate at which the intake water flows through the channel 104. Also, a narrower diameter cartridge channel segment 205 cartridge may be included in the channel 104 to increase the rate at which the intake water flows through the channel 104 and the closed circuit. As shown in FIG. 10A, multiple channel segments 206 may also be included to increase the flow rate capacity when all the segments of the channel 104 contain aligned multiple channel segments 206, which correspond to an inlet and cap formation configured for multiple channel segments 206.

An additional embodiment of the cartridge channel segment 205 is shown in FIG. 10B. The cartridge channel segment 205 includes a substantially conical shape to increase or reduce the rate at which fluid travels through the cartridge channel segment 205, thereby increasing or reducing the rate at which fluid travels through the channel 104 and the entire fluid treatment assembly 10. More specifically, the cartridge channel segment 205 is configured to correlate with a desired water flow rate for the treatment medium spaced within the corresponding cartridge. The desired water flow rate varies depending upon the treatment medium, and therefore, altering the shaped or diameter of the cartridge channel segment 205 allows a cartridge with a treatment medium that requires a faster or slower flow rate to be utilized in the fluid treatment assembly 10 by only adding or replacing the cartridge with one of the plurality of cartridges. Accordingly, a residence time the water is in contact with the water treatment medium within the cartridges may be regulated by altering the rate at which the water travels through the channel 104.

The fluid treatment assembly 10 that is used to treat a fluid, is installed by first exposing the receiving cavity 402 on the filter head assembly 400 of the appliance 300 to allow for removal or insertion of a fluid treatment assembly 10. Next, the cap 18 of the fluid treatment assembly 10 is grasped and manipulated to insert the connector 12 into the receiving cavity 402 and align it in a connecting position with the filter head assembly 400. Next, the fluid treatment assembly 10 is rotated and manipulated to align the connector 12 of the fluid treatment assembly 10 with the filter head assembly 400. More specifically, as shown in FIG. 3, the inlet 28 of the connector 12 is engaged with a water supply port 410 of the filter head assembly 400 and the outlet 30 of the connector 12 is engaged with a water delivery port 412 of the filter head assembly 400. Accordingly, a by-pass valve is opened in the filter head assembly 400 by rotating the fluid treatment assembly 10, thereby supplying a water flow from the appliance 300 through the inlet 28, through the channel 86, through the treatment medium of the cartridges wherein the water flow is treated, and thereafter dispensed through the outlet 30 back into the appliance 300.

It will be understood by one having ordinary skill in the art that construction of the described invention and other components is not limited to any specific material. Other exemplary embodiments of the invention disclosed herein may be formed from a wide variety of materials, unless described otherwise herein. In this specification and the amended claims, the singular forms "a," "an," and "the" include plural reference unless the context clearly dictates otherwise.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A water filter comprising:
   a connector;
   a cap;
   a water treatment cartridge having a first end and a second end, and a sidewall extending between and connecting the first end and the second end, the sidewall including an interior facing surface and an exterior facing surface;
   an interior volume defined by the interior facing surface;
   a water channel flow path segment formed within the sidewall that extends through the sidewall and extends between the first end and the second end;
   a water treatment medium spaced within the interior volume;
   a treated water delivery aperture that allows treated water out of the water treatment cartridge and into a treated water receiving aperture within the connector; and
   a first locking configuration disposed on the first end and a second locking configuration disposed on the second end such that the first end is configured to engage a corresponding first locking configuration on the connector and the second end is configured to engage a corresponding second locking configuration on the cap.

2. The water filter of claim 1, wherein the water treatment cartridge is configured to allow water to flow to the first end and pass through the water treatment medium, creating a closed circuit to return the water flow to an appliance, and wherein the water channel flow path segment is a cylindrical shape and has a diameter configured to reduce the rate at which the water flow travels through the water channel flow path segment and the closed circuit.

3. The water filter of claim 2, wherein the water treatment cartridge is a first water treatment cartridge, and wherein the water filter comprises a second water treatment cartridges configured to be engaged and disengaged with the first water treatment cartridge by hand and without the use of tools;
   wherein the first and second water filter treatment cartridges are disposed coaxially;
   wherein the water filter is configured to be engaged and disengaged with the appliance by hand and without the use of tools; and
   wherein each of the first and second water treatment cartridges comprises:
      a first end and a second end, and a sidewall extending between and connecting the first end and the second end, the sidewall including an interior facing surface and an exterior facing surface;
      an interior volume defined by the interior facing surface;
      a water channel flow path segment formed within the sidewall that extends through the sidewall and extends between the first end and the second end;
      a water treatment medium spaced within the interior volume;
      a treated water delivery aperture that allows treated water out of the water treatment cartridge and into a treated water receiving aperture within the connector; and
      a first locking configuration disposed on the first end and a second locking configuration disposed on the second end such that the first end is configured to engage a corresponding first locking configuration on the connector and the second end is configured to engage a corresponding second locking configuration disposed on the cap.

4. The water filter of claim 3, wherein the second locking configuration comprises an extension that extends from the second end and wherein the second end further comprises a flow passage that permits water to travel between the treatment medium spaced within the water treatment cartridge in an opposite direction than a direction of water flowing through the channel segment and wherein one of the first and second water filter treatment cartridges contains a different water treatment media from another of the first and second water filter treatment cartridges.

5. The water filter of claim 1, wherein the water treatment cartridge further comprises an extension that extends from the second end of the water treatment cartridge and a flow passage that permits water to travel between the water treatment medium spaced within the water treatment cartridge in an opposite direction than a direction of water flow through the water channel flow path segment.

6. The water filter of claim 5, wherein the second end of the water treatment cartridge comprises a threaded extension receiving aperture that receives water flow into the water treatment cartridge.

7. The water filter of claim 6, wherein the water channel flow path segment is proximate the exterior facing surface of the water treatment cartridge sidewall.

8. The water filter of claim 1, wherein the water treatment medium is sized and spaced within the interior volume to form a gap between the interior facing surface and the water treatment medium and a first end facing surface of the water treatment medium is engaged with a top cover of the water treatment cartridge that directs water radially outward toward the sidewall of the water treatment cartridge; thereafter the water is directed radially inward and through the water treatment medium and into a hollow central conduit that delivers a treated water flow to an outlet.

9. The water filter of claim 1, wherein the water treatment cartridge is a first water treatment cartridge, and the water filter comprises a second water treatment cartridge comprising:
 a first end and a second end, and a sidewall extending between and connecting the first end and the second end, the sidewall including an interior facing surface and an exterior facing surface;
 an interior volume defined by the interior facing surface;
 a water channel flow path segment formed within the sidewall that extends through the sidewall and extends between the first end and the second end;
 a water treatment medium spaced within the interior volume;
 a treated water delivery aperture that allows treated water out of the water treatment cartridge and into a treated water receiving aperture within the connector; and
 a first locking configuration disposed on the first end and a second locking configuration disposed on the second end such that the first end is configured to engage a corresponding first locking configuration on the connector and the second end is configured to engage a corresponding second locking configuration disposed on the cap;
 wherein the first water treatment cartridge is a base water treatment cartridge and wherein the water treatment medium is a base water treatment medium;
 wherein the second water treatment cartridge is an additional water treatment cartridge and wherein the water treatment medium of the second water treatment cartridge is an additional water treatment medium; and
 wherein the base water treatment cartridge matingly engages and disengages the connector by hand and without the use of tools using the first locking configuration and the base water treatment cartridge matingly engages and disengages the additional water treatment cartridge by hand and without the use of tools using the second locking configuration.

10. The water filter of claim 1, wherein the water treatment cartridge is cylindrically shaped and the water channel flow path segment has an arch-shaped cross-section within the water treatment cartridge;
 wherein the water treatment cartridge is a base water treatment cartridge, and the water filter comprises at least one additional water treatment cartridge each comprising:
 a first end and a second end, and a sidewall extending between and connecting the first end and the second end, the sidewall including an interior facing surface and an exterior facing surface;
 an interior volume defined by the interior facing surface;
 a water channel flow path segment formed within the sidewall that extends through the sidewall and extends between the first end and the second end;
 a water treatment medium spaced within the interior volume;
 a treated water delivery aperture that allows treated water out of the water treatment cartridge and into a treated water receiving aperture within the connector; and
 a first locking configuration disposed on the first end and a second locking configuration disposed on the second end such that the first end is configured to engage a corresponding first locking configuration on the connector and the second end is configured to engage a corresponding second locking configuration disposed on the cap;
 wherein the connector, the cap, the base water treatment cartridge and the at least one additional water treatment cartridge are matingly engaged and disengaged by hand and without the use of tools;
 wherein the connector, the cap, the base water treatment cartridge, and the at least one additional water treatment cartridge form the water filter when the connector, the cap, the base water treatment cartridge and the additional water treatment cartridge are engaged with one another; and
 wherein the water filter engages and disengages an appliance by hand and without the use of tools.

11. The water filter of claim 1, comprising at least one keyed mating arrangement on an exterior facing surface of the first end, each including at least one protrusion having a neck portion that extends from the water treatment cartridge and a head portion on the neck portion, wherein the head portion is larger in diameter than the neck portion and wherein the second locking configuration is at least one recess on an exterior facing surface of the second end.

12. The water filter of claim 1, wherein the water channel flow path segment is proximate the exterior facing surface of the water treatment cartridge sidewall.

13. A water filter comprising:
 a connector segment that engages an appliance;
 a cap segment;
 a base water treatment cartridge disposed between the connector segment and the cap segment; and
 wherein the base water treatment cartridge comprises:
 an untreated water receiving end that receives untreated water into an interior volume of the base water treatment cartridge;
 a treated water delivering end opposite the untreated water receiving end that delivers water treated by a water treatment medium within the interior volume;
 a sidewall extending between the untreated water receiving end and the treated water delivery end, enclosing the interior volume defined by an interior wall;

a water channel flow path segment formed within the sidewall that extends within the sidewall and between the untreated water receiving end and the treated water delivery end; and a treated water outlet extension protruding from the untreated water receiving end of the base water treatment cartridge that allows a flow of water to travel between the treatment medium spaced within the base water treatment cartridge in an opposite direction than a direction of untreated water flowing through the water channel flow path segment.

14. The water filter of claim 13 further comprising a first locking configuration disposed on an exterior facing surface of the untreated water receiving end and a second locking configuration disposed on an exterior facing surface of the treated water delivery end such that the untreated water receiving end is configured to directly engage a first mating configuration of the connector segment and the treated water delivery end is configured to directly engage a second mating configuration of the cap segment.

15. The water filter of claim 13, wherein the base water treatment cartridge is cylindrically shaped and wherein the untreated water is received in an inlet in the treated water delivering end that is in fluid communication with the water channel flow path segment thereby enabling untreated water to flow from the inlet to the untreated water receiving end of the base water treatment cartridge and wherein the flow of water through the water filter has a substantially serpentine flow path through the base water treatment cartridge and wherein treated water is delivered to the appliance from a treated water outlet of the connector segment.

16. The water filter of claim 15 further comprising an additional water treatment cartridge that substantially aligns coaxially with the base water treatment cartridge and wherein the additional water treatment cartridge has a water channel flow path segment formed within the sidewall of the additional water treatment cartridge and the water channel flow path segment of the additional water treatment cartridge extends within the sidewall and between the untreated water receiving end and the treated water delivery end of the additional water treatment cartridge and align together to form a water channel flow path that allows untreated water to flow from the connector segment to the cap segment through the base water treatment cartridge and the additional water treatment cartridge positioned between the base water treatment cartridge and the cap segment.

17. The water filter of claim 16, wherein the water channel flow path segment of the base water treatment cartridge has an arch-shaped cross-section and the water channel flow path segment of the additional water treatment cartridge has an arch-shaped cross-section.

18. A water filter comprising:
a plurality of water treatment cartridges that are removably engaged and disengaged with one another by hand and without the use of tools, wherein each of the plurality of water treatment cartridges comprises:
a cartridge housing comprising:
a water admission end that receives water into an interior volume of the water treatment cartridge that also contains a water treatment medium;
an outlet end that releases water treated by the water treatment medium out an outlet on the outlet end;
a sidewall extending between the water admission end and the outlet end, enclosing the interior volume and having an interior wall;
a water channel flow path segment formed within the sidewall that does not contain the water treatment medium while the water is within the water channel flow path segment and wherein the water channel flow path segment extends within the sidewall between the water admission end and the outlet end; and
a treated water delivery projection that extends from the outlet end of the water treatment cartridge.

\* \* \* \* \*